US011695119B2

(12) United States Patent
Munaoka et al.

(10) Patent No.: US 11,695,119 B2
(45) Date of Patent: Jul. 4, 2023

(54) NEGATIVE ELECTRODE FOR SECONDARY BATTERY, SECONDARY BATTERY, BATTERY PACK, ELECTRIC VEHICLE, POWER STORAGE SYSTEM, POWER TOOL, AND ELECTRONIC DEVICE

(71) Applicant: MURATA MANUFACTURING CO., LTD., Kyoto (JP)

(72) Inventors: Takatoshi Munaoka, Kyoto (JP); Masayuki Ihara, Kyoto (JP); Shigeru Fujita, Kyoto (JP); Takuju Hashimoto, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 72 days.

(21) Appl. No.: 16/039,482

(22) Filed: Jul. 19, 2018

(65) Prior Publication Data
US 2018/0323434 A1    Nov. 8, 2018

Related U.S. Application Data

(63) Continuation of application No. PCT/JP2017/002703, filed on Jan. 26, 2017.

(30) Foreign Application Priority Data

Jan. 29, 2016    (JP) .............................. JP2016-015298

(51) Int. Cl.
*H01M 4/62* (2006.01)
*H01M 4/134* (2010.01)
(Continued)

(52) U.S. Cl.
CPC ........... *H01M 4/623* (2013.01); *H01M 4/133* (2013.01); *H01M 4/134* (2013.01); *H01M 4/386* (2013.01);
(Continued)

(58) Field of Classification Search
CPC ...... H01M 4/623; H01M 4/621; H01M 4/622; H01M 2004/021; H01M 2004/027; H01M 10/0569; H01M 4/62
See application file for complete search history.

(56) References Cited

U.S. PATENT DOCUMENTS

2009/0267028 A1\* 10/2009 Hoshiba ................. H01G 11/38
                                                                    252/500
2013/0052523 A1\* 2/2013 Yamada .................. B60L 50/64
                                                                    429/199
(Continued)

FOREIGN PATENT DOCUMENTS

CN    101090166    \* 12/2007
CN    102969530    3/2013
(Continued)

OTHER PUBLICATIONS

"compose." Dictionary.com. 2021. https://www.dictionary.com/browse/compose (Oct. 10, 2021). (Year: 2021).\*
(Continued)

*Primary Examiner* — Matthew W Van Oudenaren
(74) *Attorney, Agent, or Firm* — K&L Gates LLP

(57) ABSTRACT

The secondary battery includes an electrolytic solution, a positive electrode and a negative electrode, and the negative electrode includes a plurality of particulate negative electrode active materials, a first negative electrode binder, and a plurality of second negative electrode binders with an average particle size smaller than the plurality of particulate negative electrode active materials. The plurality of particulate negative electrode active materials have an average particle size of 5 μm or more and 30 μm or less. The first negative electrode binder includes one or both of a styrene butadiene rubber and a derivative thereof. The plurality of second negative electrode binders include one or both of a polyvinylidene fluoride and a derivative thereof, and the (Continued)

plurality of second negative electrode binders have an average particle size of 0.1 μm or more and 10 μm or less.

13 Claims, 9 Drawing Sheets

(51) Int. Cl.
| | |
|---|---|
| *H01M 4/133* | (2010.01) |
| *H01M 50/119* | (2021.01) |
| *H01M 50/121* | (2021.01) |
| *H01M 50/126* | (2021.01) |
| *H01M 4/38* | (2006.01) |
| *H01M 10/42* | (2006.01) |
| *H01M 10/0587* | (2010.01) |
| *H01M 10/0569* | (2010.01) |
| *H01M 10/0568* | (2010.01) |
| *H01M 10/0567* | (2010.01) |
| *B60K 6/28* | (2007.10) |
| *H01M 4/587* | (2010.01) |
| *H01M 10/0525* | (2010.01) |
| *H01M 4/02* | (2006.01) |

(52) U.S. Cl.
CPC ........... *H01M 4/62* (2013.01); *H01M 10/425* (2013.01); *H01M 50/119* (2021.01); *H01M 50/121* (2021.01); *H01M 50/126* (2021.01); *B60K 6/28* (2013.01); *B60Y 2200/91* (2013.01); *B60Y 2200/92* (2013.01); *B60Y 2400/112* (2013.01); *H01M 4/587* (2013.01); *H01M 10/0525* (2013.01); *H01M 10/0567* (2013.01); *H01M 10/0568* (2013.01); *H01M 10/0569* (2013.01); *H01M 10/0587* (2013.01); *H01M 2004/021* (2013.01); *H01M 2004/027* (2013.01); *Y02E 60/10* (2013.01); *Y02T 10/70* (2013.01)

(56) References Cited

U.S. PATENT DOCUMENTS

| | | | | |
|---|---|---|---|---|
| 2013/0260243 A1* | 10/2013 | Ikeda | .................... | H01M 4/134 |
| | | | | 429/218.1 |
| 2013/0337315 A1* | 12/2013 | Yamamoto | ............ | H01M 4/622 |
| | | | | 429/163 |
| 2015/0194677 A1* | 7/2015 | Jeong | .................... | H01M 4/622 |
| | | | | 429/217 |
| 2016/0293957 A1* | 10/2016 | Okae | ................. | H01M 10/0525 |

FOREIGN PATENT DOCUMENTS

| | | | |
|---|---|---|---|
| JP | 2013-051081 A | | 3/2013 |
| JP | 2014-203805 A | | 10/2014 |
| JP | 2014203805 | * | 10/2014 |
| WO | WO2015079624 | * | 6/2015 |

OTHER PUBLICATIONS

International Search Report and Written Opinion issued in connection with International Patent Application No. PCT/JP2017/002703, dated Mar. 21, 2017. (6 pages).

Japanese Office Action dated Aug. 13, 2019 in corresponding Japanese Application No. 2017-563812.

Japanese Office Action dated Jun. 9, 2020 in corresponding Japanese Application No. 2017-563812.

Masafumi Arakawa, Introduction to Particle Size Measurement, Journal of the Society of Powder Technology Japan, vol. 17, No. 6, pp. 299-307, Jun. 10, 1980.

Chinese Office Action dated Jul. 31, 2020 in corresponding Chinese Application No. 201780008236.1.

Chinese Office Action dated Jan. 22, 2021 in corresponding Chinese Application No. 201780008236.1.

Chinese Office Action dated May 11, 2021 in corresponding Chinese Application No. 201780008236.1.

Chinese Office Action dated Dec. 21, 2021 in corresponding Chinese Application No. 201780008236.1.

Chinese Office Action dated Feb. 22, 2022 in corresponding Chinese Application No. 201780008236.1.

* cited by examiner 201　　203　　201

201　　203　　201

201 201 201 201

201 201 201 201

NEGATIVE ELECTRODE FOR SECONDARY BATTERY, SECONDARY BATTERY, BATTERY PACK, ELECTRIC VEHICLE, POWER STORAGE SYSTEM, POWER TOOL, AND ELECTRONIC DEVICE

CROSS REFERENCE TO RELATED APPLICATIONS

The present application is a continuation of PCT patent application no. PCT/JP2017/002703, filed on Jan. 26, 2017, which claims priority to Japanese patent application no. JP2016-015298 filed on Jan. 29, 2016, the entire contents of which are being incorporated herein by reference.

BACKGROUND

The present technology generally relates to a negative electrode for a secondary battery, including a negative electrode active material and a negative electrode binder, a secondary battery that uses the negative electrode for the secondary battery, as well as a battery pack, an electric vehicle, a power storage system, a power tool, and an electronic device that use the secondary battery.

Various electronic devices such as mobile phones and personal digital assistants (PDA) have been widely diffused, and there has been demand for reduction in size, reduction in weight, and increase in life for the electronic devices. Accordingly, the development of batteries, in particular, small-size and light-weight secondary batteries capable of acquiring a high energy density has been advanced as power supplies.

The secondary batteries are applied to the electronic devices mentioned above, but also considered applied to other uses. An example of the other uses is a battery pack that is detachably mounted on an electronic device or the like, an electric vehicle such as an electric car, a power storage system such as a home electric power server, and a power tool such as an electric drill.

The secondary battery includes an electrolytic solution together with a positive electrode and a negative electrode, and the negative electrode includes a negative electrode active material and a negative electrode binder. The configuration of the negative electrode greatly affects the battery characteristics, and various studies have been thus made regarding the configuration of the negative electrode.

Specifically, in order to improve the adhesion between a separator and an electrode, two or more aqueous binders are used as a binder for the negative electrode when the separator includes a nonaqueous binder. One aqueous binder of the two or more aqueous binders includes the same type of monomer unit as the monomer unit of the above-mentioned nonaqueous binder.

SUMMARY

The present technology generally relates to a negative electrode for a secondary battery, including a negative electrode active material and a negative electrode binder, a secondary battery that uses the negative electrode for the secondary battery, as well as a battery pack, an electric vehicle, a power storage system, a power tool, and an electronic device that use the secondary battery.

The electronic devices and the like have been more and more increased in performance and function. Accordingly, the frequency of use of electronic devices and the like has been increased, and the usage environment for the electronic devices and the like has been expanded. Therefore, there is still room for improvement regarding the battery characteristics of the secondary batteries.

Accordingly, it is desirable to provide a negative electrode for a secondary battery, a secondary battery, a battery pack, an electric vehicle, a power storage system, a power tool, and an electronic device, which are capable of exhibiting excellent battery characteristics.

According to an embodiment of the present technology, a negative electrode for a secondary battery is provided. The negative electrode includes a plurality of particulate negative electrode active materials, a first negative electrode binder, and a plurality of second negative electrode binders with an average particle size smaller than the plurality of particulate negative electrode active materials. The plurality of particulate negative electrode active materials have an average particle size of 5 μm or more and 30 μm or less. The first negative electrode binder includes one or both of a styrene butadiene rubber and a derivative thereof. The plurality of second negative electrode binders include one or both of a polyvinylidene fluoride and a derivative thereof, and the plurality of second negative electrode binders have an average particle size of 0.1 μm or more and 10 μm or less.

According to an embodiment of the present technology, a secondary battery includes a positive electrode, a negative electrode, and an electrolytic solution, and the negative electrode has the same configuration as that of the negative electrode for a secondary battery according to the embodiment of the present technology as described herein.

According to another embodiment of the present technology, Each of a battery pack, an electric vehicle, a power storage system, a power tool, and an electronic device includes a secondary battery, and the secondary battery has the same configuration as that of the secondary battery according to the embodiment as described herein.

The "average particle size" mentioned above refers to the median diameter D50 (μm). As just described, the "average particle size" also means the median diameter D50 (μm) as well in the following description. More specifically, the median diameter D50 for the plurality of particulate second negative electrode binders is smaller than the median diameter D50 for the plurality of particulate negative electrode active materials.

The negative electrode for a secondary battery or the secondary battery according to an embodiment of the present technology includes the plurality of particulate negative electrode active materials, the first negative electrode binder, and the plurality o second negative electrode binder as described herein, thus making it possible to achieve excellent battery characteristics. In addition, the battery pack, the electric vehicle, the power storage system, the power tool, or the electronic device according to the embodiments of the present technology achieve a similar effect.

It should be understood that the effects described herein are not necessarily limited, and other suitable properties relating to the present technology may be realized and as further described.

DETAILED DESCRIPTION

The present technology generally relates to a negative electrode for a secondary battery, including a negative electrode active material and a negative electrode binder, a secondary battery that uses the negative electrode for the secondary battery, as well as a battery pack, an electric vehicle, a power storage system, a power tool, and an electronic device that use the secondary battery. As described herein, the present disclosure will be described based on examples with reference to the drawings, but the present disclosure is not to be considered limited to the examples, and various numerical values and materials in the examples are considered by way of example.

First, a negative electrode for a secondary battery according to an embodiment of the present technology will be described.

The negative electrode for a secondary battery (hereinafter also referred to simply as a "negative electrode") according to an embodiment of the present technology is applied to an electrochemical device such as a secondary battery. The type of the secondary battery to which the negative electrode is applied is not particularly limited, but is, for example, a secondary battery or the like which acquires a battery capacity through the occlusion and release of the electrode reactant.

The electrode reactant is a substance that is involved in the electrode reaction with the use of the negative electrode, and the electrode reactant is occluded and released by the negative electrode during electrode reaction. As a specific example of the type of secondary battery, a secondary battery that uses lithium (or lithium ion) as an electrode reactant is a so-called lithium ion secondary battery.

The negative electrode according to an embodiment is configured as described below.

Figure 1:
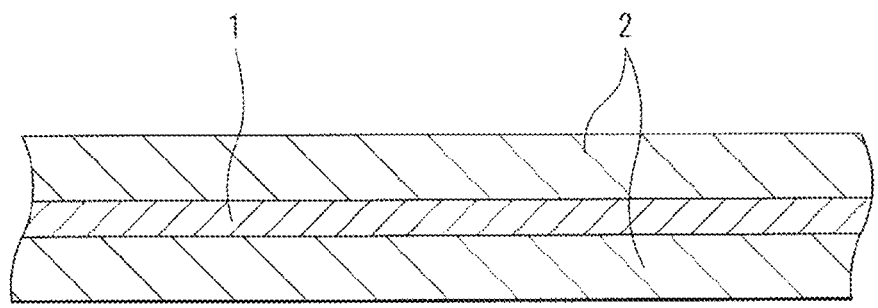
FIG. 1 is a cross-sectional view illustrating the configuration of a negative electrode for a secondary battery according to an embodiment of the present technology.

FIG. 1 shows a cross-sectional configuration of a negative electrode. This negative electrode includes, for example, a negative electrode current collector 1 and a negative electrode active material layer 2 provided on the negative electrode current collector 1.

It should be understood that the negative electrode active material layer 2 may be provided only on one side of the negative electrode current collector 1, or provided on both sides of the negative electrode current collector 1. FIG. 1 shows, for example, a case where the negative electrode active material layer 2 is provided on both sides of the negative electrode current collector 1.

The negative electrode current collector 1 includes, for example, any one of, or two or more of conductive materials. The types of the conductive materials are not particularly limited, but may be, for example, a metal material such as copper, aluminum, nickel, and stainless steel. This metal material is not limited to a simple substance of metal but may be an alloy. It should be understood that the negative electrode current collector 1 may be a single layer or a multilayer.

The surface of the negative electrode current collector 1 is preferably roughened. This is because the adhesion of the negative electrode active material layer 2 to the negative electrode current collector 1 is improved due to a so-called anchor effect. In this case, the surface of the negative electrode current collector 1 has only to be roughened at least in a region opposed to the negative electrode active material layer 2. The roughening method is, for example, a method such as forming fine particles through the use of electrolytic treatment. The electrolytic treatment provides the surface of the negative electrode current collector 1 with irregularities, because fine particles are formed on the surface of the negative electrode current collector 1 with an electrolytic method in an electrolytic cell. Copper foil prepared by an electrolytic method is generally referred to as electrolytic copper foil.

The negative electrode active material layer 2 includes a plurality of particulate negative electrode active materials, a first negative electrode binder, and a plurality of particulate second negative electrode binders. However, the negative electrode active material layer 2 may further include any one of, or two or more of other materials such as a negative electrode conductive agent according to an embodiment of the present technology.

In an electrochemical device such as a secondary battery where the negative electrode is used, the chargeable capacity of the negative electrode active material is preferably higher than the discharged capacity of the positive electrode in order to prevent the electrode reactant from being unintentionally deposited at the negative electrode in the process of charging. More specifically, the electrochemical equivalent of the negative electrode active material capable of occluding and releasing the electrode reactant is preferably larger than the electrochemical equivalent of the positive electrode.

It should be understood that the electrode reactant deposited at the negative electrode is, for example, a so-called lithium metal when the electrode reactant is lithium.

The shape of the negative electrode active material is particulate as mentioned above. Accordingly, the plurality of particulate negative electrode active materials is dispersed in the negative electrode active material layer 2.

The term "particulate" described herein means that the plurality of negative electrode active materials respectively has particulates physically separated from each other. More specifically, when the cross section of the negative electrode active material layer 2 including the plurality of negative electrode active materials is observed with the use of a microscope such as an electron microscope, the plurality of negative electrode active materials is each visually recognized as a particulate object in the observation result (microscope photograph).

However, the shape of the negative electrode active material is not particularly limited. More specifically, the plurality of negative electrode active materials may each have a spherical shape, a substantially spherical shape, or other shapes. Of course, the plurality of negative electrode active materials may each have the same shape, or different shapes from each other.

The negative electrode active material includes any one of, or two or more of negative electrode materials capable of occluding and releasing the electrode reactant.

The negative electrode materials may be, for example, any one of, or two or more of carbon materials. This is because the crystal structures of the carbon materials are very unlikely to change during the occlusion and release of the electrode reactant, thus stably achieving a high energy density. In addition, this is because the carbon materials also function as negative electrode conductive agents, thus improving the conductivity of the negative electrode active material layer 2.

The carbon materials may be, for example, graphitizable carbon, non-graphitizable carbon, and graphite. However, the interplanar spacing of the (002) plane with respect to the non-graphitizable carbon is preferably 0.37 nm or more, and the interplanar spacing of the (002) plane with respect to the graphite is preferably 0.34 nm or less. More specifically, the carbon materials may be, for example, pyrolytic carbons, coke, glassy carbon fibers, fired bodies of organic polymer compounds, activated carbon, and carbon blacks. This coke includes pitch coke, needle coke, and petroleum coke. The fired body of the organic polymer compound is a polymer compound fired (carbonized) at an appropriate temperature, and the polymer compound is, for example, a phenol resin and a furan resin. Besides, the carbon materials may be low-crystallinity carbon subjected to a heat treatment at a temperature of about 1000° C. or lower, or may be amorphous carbon. It should be understood that the shapes of the carbon materials may be any of fibrous, spherical, granular and scaly.

In addition, the negative electrode materials may be, for example, a material (metallic material) containing any one of, or two or more of metal elements and metalloid elements as constituent element(s). This is because a high energy density is obtained.

The metallic material may be a simple substance, an alloy, a compound, two or more thereof, and a material at least partially including one or more phases thereof. However, the alloy may be a material containing two or more metal elements as constituent elements, or a material containing one or more metal elements and one or more metalloid elements as constituent elements. In addition, the alloy may contain any one of, or two or more of nonmetallic elements. The compositional structure of the metallic material is not particularly limited, but may be a solid solution, a eutectic (eutectic mixture), an intermetallic compound, and coexisting two or more thereof.

The above-mentioned metal elements and metalloid elements may be, for example, any one of, or two or more of metal elements and metalloid elements capable of forming an alloy with the electrode reactant. Specifically, the elements include, for example, magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

Above all, one or both of silicon and tin are preferred. This is because the ability to occlude and release the electrode reactant is excellent, thus achieving a remarkably high energy density.

The material containing one or both of silicon and tin as a constituent element may be any of a simple substance, an alloy, and a compound of silicon, may be any of a simple substance, an alloy, and a compound of tin, may be two or more of the foregoing, or may be a material at least partially including one or more phases of the foregoing. However, the term "simple substance" according to the present technology consistently means a simple substance (which may contain trace amounts of impurities) in a general sense, and does not necessarily mean a purity of 100%.

Above all, a material containing silicon as a constituent element (silicon-based material) is preferred. This is because an adequate energy density is obtained. The silicon-based material may be a simple substance of silicon, an alloy of silicon, a compound of silicon, two or more thereof, and a material at least partially including one or more phases thereof.

The alloy of silicon contains, for example, as a constituent element other than silicon, any one of, or two or more of tin, nickel, copper, iron, cobalt, manganese, zinc, indium, silver, titanium, germanium, bismuth, antimony and chromium. The compound of silicon contains, for example, as a constituent element other than silicon, any one of, or two or more of carbon, oxygen and the like. It should be understood that the compound of silicon may contain, for example, as a constituent element other than silicon, any one of, or two or more of the series of elements described for the alloy of silicon.

Specific examples of the alloy of silicon and the compound of silicon are $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and $LiSiO$. It should be understood that v in $SiO_v$ meets $0<v\leq2$, preferably $0.2<v<1.4$.

The alloy of tin contains, for example, as a constituent element other than tin, any one of, or two or more of silicon, nickel, copper, iron, cobalt, manganese, zinc, indium, silver, titanium, germanium, bismuth, antimony and chromium. The compound of tin contains, for example, as a constituent element other than tin, any one of, or two or more of carbon, oxygen and the like. It should be understood that the compound of tin may contain, for example, as a constituent element other than tin, any one of, or two or more of the series of elements described for the alloy of tin.

Specific examples of the alloy of tin and the compound of tin are $SnO_w$ ($0<w\leq2$), $SnSiO_3$, $LiSnO$, and $Mg_2Sn$.

In particular, the material containing tin as a constituent element is preferably, for example, a material (Sn-containing material) containing a second constituent element and a third constituent element, together with tin which is a first constituent element. The second constituent element contains, for example, at least one of, or two or more of cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, silicon, and the like. The third constituent element contains, for example, any one of, or two or more of boron, carbon, aluminum, phosphorus (P), and the like. This is because the Sn-containing material contains the second constituent element and the third constituent element, thereby achieving a high battery capacity, excellent cycle characteristics, and the like.

In particular, the Sn-containing material is preferably a material (SnCoC-containing material) containing tin, cobalt, and carbon as constituent elements. This SnCoC-containing material has an arbitrary composition. The content of carbon is, for example, 9.9 mass % to 29.7 mass %. The ratio between the contents of tin and cobalt (Co/(Sn+Co)) is, for example, 20 mass % to 70 mass %. This is because a high energy density is obtained.

The SnCoC-containing material has a phase containing tin, cobalt, and carbon as constituent elements, and the phase is preferably low-crystallinity or amorphous. This phase is a phase (reaction phase) capable of reacting with the electrode reactant, and excellent characteristics are thus achieved due to the presence of the reaction phase. Of course, the reaction phase may include a low-crystallinity part and an amorphous part. The half-value width (diffraction angle 2θ) of the diffraction peak obtained by X-ray diffraction with respect to this reaction phase is preferably 1° or more in the case of using the CuKα ray as a specific X-ray and providing a sweep speed of 1°/min. This is because of more smoothly occluding and releasing the electrode reactant in the SnCoC-containing material, and reducing the reactivity of the SnCoC-containing material with respect to the electrolytic solution. It should be understood that the SnCoC-containing material may include, in addition to the low-crystallinity or amorphous phase, a phase containing therein a simple element or a part of each constituent element in some cases.

Whether the diffraction peak obtained by X-ray diffraction corresponds to the reaction phase capable of reacting with the electrode reactant or not can be easily determined by, for example, comparing X-ray diffraction charts before and after the electrochemical reaction with the electrode reactant. Specifically, for example, when the position of the diffraction peak is changed between before and after the electrochemical reaction with the electrode reactant, the peak corresponds to the reaction phase capable of reacting with the electrode reactant. In this case, for example, the diffraction peak of the low-crystallinity or amorphous reaction phase is observed at 2θ=20° to 50°. Such a reaction phase contains, for example, the constituent elements mentioned above, and it is believed that the phase is low crystallized or amorphized mainly due to the presence of carbon.

In the SnCoC-containing material, the carbon as a constituent element is preferably at least partially bonded to a metal element or a metalloid element which is another constituent element. This is because aggregation or crystallization of tin and the like is suppressed. It is possible to confirm the bonding states of the elements through the use of, for example, X-ray photoelectron spectroscopy (XPS). For commercially available devices, for example, the Al-Kα ray, the Mg-Kα ray, or the like is used as a soft X-ray. When carbon is at least partially bonded to a metal element, a metalloid element, or the like, the peak of the synthetic wave of the 1 s orbital (C 1 s) of carbon appears in a region that is lower than 284.5 eV. It should be understood that that the peak of the 4f orbital (Au 4f) of a gold atom is assumed to be subjected to energy calibration so as to be obtained at 84.0 eV. In this regard, typically, surface contaminated carbon is present on the surface of the substance, and thus, while the peak of C 1 s of the surface contaminated carbon is determined to be 284.8 eV, the peak is regarded as an energy reference. In the XPS measurement, the waveform of the C 1 s peak is obtained in a form including the peak of the surface contaminated carbon and the peak of the carbon in the SnCoC-containing material. For this reason, the both peaks are separated, for example, by analysis with the use of commercially available software. In the analysis of the waveform, the position of the main peak present on the lowest binding energy side is determined to be an energy reference (284.8 eV).

This SnCoC-containing material is not limited to a material (SnCoC) where the constituent elements are only tin, cobalt, and carbon. This SnCoC-containing material may further contain, for example, in addition to tin, cobalt, and carbon, any one of, or two or more of silicon, iron, nickel, chromium, indium, niobium, germanium, titanium, molybdenum, aluminum, phosphorus, gallium, bismuth, and the like as constituent elements.

Besides the SnCoC-containing material, a material (SnCoFeC-containing material) containing tin, cobalt, iron, and carbon as constituent elements is also preferred. This SnCoFeC-containing material has an arbitrary composition. To give an example, when the content of iron is set to be smaller, the content of carbon is 9.9 mass % to 29.7 mass %, the content of iron is 0.3 mass % to 5.9 mass %, and the ratio between the contents of tin and cobalt (Co/(Sn+Co)) is 30 mass % to 70 mass %. On the other hand, when the content of iron is set to be larger, the content of carbon is 11.9 mass % to 29.7 mass %, the ratio between the contents of tin, cobalt and iron ((Co+Fe)/(Sn+Co+Fe)) is 26.4 mass % to 48.5 mass %, and the ratio between the contents of cobalt and iron (Co/(Co+Fe)) is 9.9 mass % to 79.5 mass %. This is because a high energy density is obtained in such a composition range. It should be understood that the physical properties (e.g., half-value width) of the SnCoFeC-containing material are similar to the physical properties of the SnCoC-containing material mentioned above.

Besides, the negative electrode materials may be, for example, any one of, or two or more of metal oxides, polymer compounds, and the like. The metal oxides may be, for example, iron oxides, ruthenium oxides, molybdenum oxides, and the like. The polymer compounds may be, for example, polyacetylene, polyaniline, polypyrrole, and the like.

In particular, the negative electrode material preferably includes both the carbon material and the metallic material for the following reason. In other words, preferably, of the plurality of particulate negative electrode active materials, some of the negative electrode active materials partially include the carbon material, and the other negative electrode active materials include the metallic material.

The metallic material, in particular, a material containing one or both of silicon and tin as a constituent element has the advantage of high theoretical capacity, but at the same time, has a concern about being likely to expand and shrink intensely during charging/discharging. On the other hand, the carbon material has a concern about being low in theoretical capacity, but at the same time, has the advantage of being unlikely to expand and shrink during charging/discharging. Therefore, the use of the carbon material in combination with the metallic material suppresses the expansion and shrinkage during charging/discharging while achieving a high theoretical capacity (in other words, battery capacity).

The plurality of negative electrode active materials have an average particle size of about 5 μm to 30 μm. This is because the average particle size for the plurality of negative electrode active materials is optimized such that the average particle size for the plurality of negative electrode active materials is sufficiently large with respect to the average particle size for the plurality of second negative electrode binders. Thus, as will be described later, the plurality of second negative electrode binders is made more likely to be present on the surfaces of the negative electrode active materials while being sufficiently dispersed. The "average particle size" described here refers to the median diameter D50 (μm) as mentioned above.

In the case of examining the average particle size for the plurality of negative electrode active materials, for example, after measuring the respective particle sizes of the plurality of (e.g., 100) negative electrode active materials by observing the cross section of the negative electrode active material layer 2 with the use of a microscope such as an electron microscope, and the average particle size may be then calculated on the basis of the measurement results.

The first negative electrode binder mainly serves as a material for fixing the negative electrode active material layer 2 to the negative electrode current collector 1 by bonding the negative electrode current collector 1 and the negative electrode active material.

The shape of the first negative electrode binder is not particularly limited. For this reason, the shape of the first negative electrode binder may have, for example, the form of particles, or other shapes.

The first negative electrode binder includes any one of, or two or more of a styrene butadiene rubber (a copolymer of styrene and 1,3-butadiene) and derivatives thereof.

The "derivative" mentioned above refers to a compound with one or more types of groups (derivatization groups) introduced into a styrene butadiene rubber. The types, number, introduction sites, and the like of the derivatization groups are not particularly limited. Specifically, the derivatization groups may be, for example, a saturated or unsaturated hydrocarbon group, may be a group containing, as a constituent element, a non-carbon element such as oxygen (O), nitrogen (N), and sulfur (S) together with carbon (C), or may be other groups.

The reason why the first negative electrode binder includes the styrene butadiene rubber and derivatives thereof is because the negative electrode current collector 1 and the negative electrode active material are made more likely to be bonded with the first negative electrode binder interposed therebetween.

The plurality of second negative electrode binders mainly serves as a material for bonding the plurality of negative electrode active materials to each other, by being present while being dispersed on the respective surfaces of the plurality of negative electrode active materials.

The shape of the second negative electrode binder is particulate like the shape of the negative electrode active material as mentioned above. Accordingly, the second negative electrode binders are mainly dispersed in the negative electrode active material layer 2 while being present on the respective surfaces of the plurality of negative electrode active materials.

Details concerning the above-mentioned term "particulate" are the same as in the case of the description of the plurality of particulate negative electrode active materials. More specifically, the plurality of second negative electrode binders respectively has particulates physically separated from each other, and thus, when the cross section of the negative electrode active material layer 2 including the plurality of second negative electrode binders is observed, the plurality of second negative electrode binders is each visually recognized as a particulate object. However, the plurality of second negative electrode binders is not particularly limited on the respective shapes, and thus may have substantially spherical shapes, or other shapes.

The second negative electrode binder includes any one of, or two or more of polyvinylidene fluoride (homopolymer of vinylidene fluoride) and derivatives thereof. It should be understood that details concerning the term "derivative" are the same as in the case of the description of the derivative of the styrene butadiene rubber.

The reason why the second negative electrode binder includes polyvinylidene fluoride and derivatives thereof is because due to the use of an aqueous solvent as a solvent in the step of forming the negative electrode active material layer 2 as described later, the second negative electrode binder is not dissolved by the aqueous solvent. Thus, the plurality of second negative electrode binders is dispersed in the negative electrode active material layer 2 while maintaining the particulate state, thereby making the plurality of negative electrode active materials more likely to be bonded to each other with the plurality of second negative electrode binders interposed therebetween.

Further, for an electrochemical device such as a secondary battery with the negative electrode applied thereto, for example, a separator or the like adjacent to the negative electrode preferably includes the same material as the second negative electrode binder. This is because the affinity between the negative electrode and the separator or the like is increased, thereby improving the adhesion between the negative electrode and the separator or the like.

As described herein, in order to bond the plurality of negative electrode active materials to each other, the plurality of second negative electrode binders has an average particle size smaller than the average particle size for the plurality of negative electrode active materials. The "average particle size" described here refers to the median diameter D50 (μm) as mentioned above. More specifically, the median diameter D50 for the plurality of second negative electrode binders is smaller than the median diameter D50 for the plurality of negative electrode active materials. Thus, the specific surface area (m²/g) of the plurality of second negative electrode binders is larger than the specific surface area of the plurality of negative electrode active materials.

The average particle size for the plurality of second negative electrode binders is smaller than the average particle size for the plurality of negative electrode active materials, because as described later, the plurality of second negative electrode binders with a relatively small average particle size is made more likely to be dispersed than the plurality of negative electrode active materials with a relatively large average particle in the step of forming the negative electrode active material layer 2. This makes the plurality of second negative electrode binders more likely to be present while being dispersed on the surfaces of the negative electrode active materials, thus making the plurality of negative electrode active materials more likely to be bonded to each other with the plurality of second negative electrode binders interposed therebetween.

In this case, in particular, the plurality of negative electrode active materials is sufficiently bonded to each other through the use of the plurality of second negative electrode binders, and the required total amount of the binders included in the negative electrode active material layer 2 is thus smaller. Thus, the proportion of the negative electrode active material included in the negative electrode active material layer 2 is relatively sufficiently increased.

Furthermore, the surfaces of the negative electrode active materials are coated (protected) with the plurality of second negative electrode binders, because the plurality of second negative electrode binder is present on the surfaces of the negative electrode active materials. Thus, the reaction between the highly reactive negative electrode active material and the electrolytic solution is suppressed, thereby suppressing the generation of gas due to the decomposition reaction of the electrolytic solution.

Specifically, the plurality of second negative electrode binders have an average particle size of about 0.1 µm to 10 µm. This is because the average particle size for the plurality of second negative electrode binders is optimized such that the average particle size for the plurality of second negative electrode binders is sufficiently small with respect to the average particle size for the plurality of negative electrode active materials. Thus, the plurality of second negative electrode binders is made more likely to be present while being dispersed on the surfaces of the negative electrode active materials.

In the case of examining the average particle size for the plurality of second negative electrode binders, for example, after measuring the respective particle sizes of the plurality of (e.g., 100) second negative electrode binders by observing the cross section of the negative electrode active material layer 2 with the use of a microscope such as an electron microscope, and the average particle size may be then calculated on the basis of the measurement results.

Figure 2A:
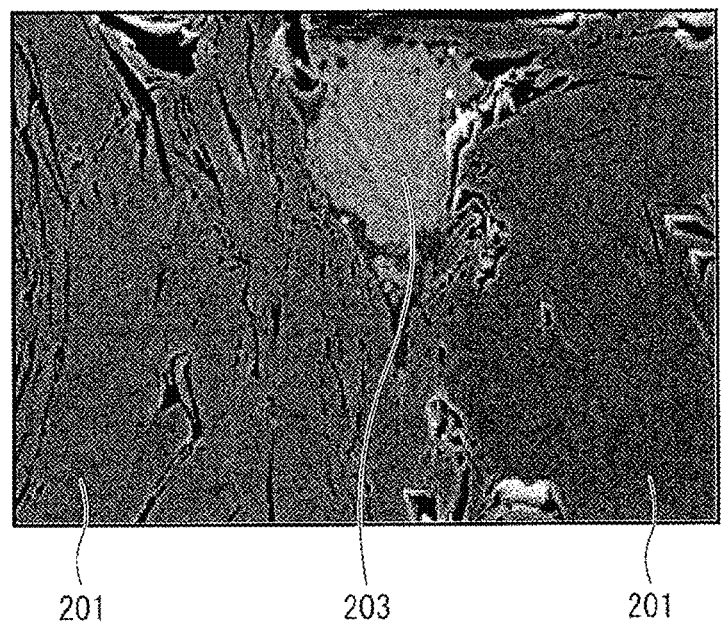
FIG. 2A is an SEM (scanning electron microscope) photograph showing a cross-sectional configuration of a negative electrode active material layer including a second negative electrode binder according to an embodiment of the present technology.
Figure 2B:
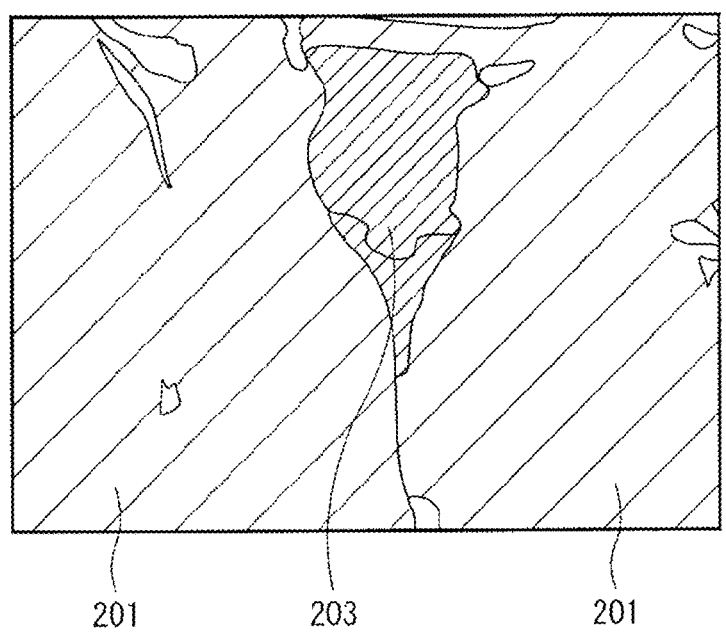
FIG. 2B is a cross-sectional view schematically illustrating a main part of the SEM photograph shown in FIG. 2A.

FIG. 2A is a SEM photograph showing a cross-sectional configuration of the negative electrode active material layer 2 including the second negative electrode binder, and FIG. 2B schematically shows a main part of the SEM photograph shown in FIG. 2A.

Figure 3A:
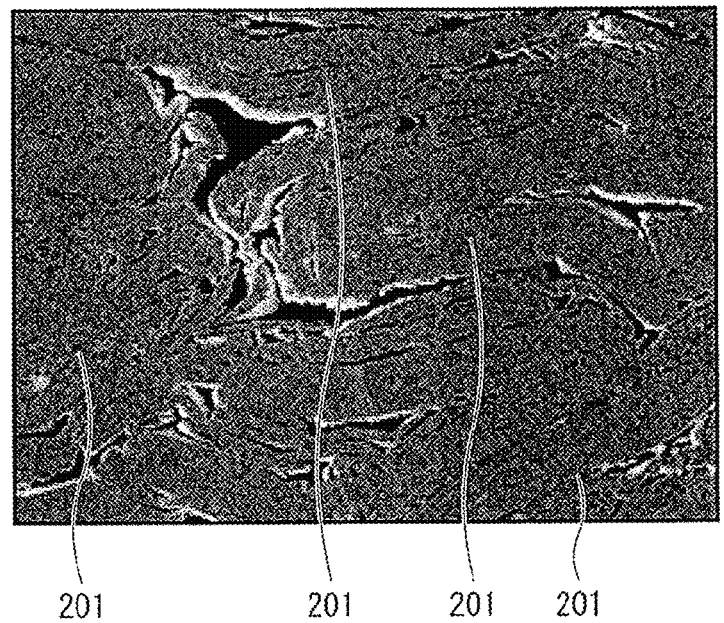
FIG. 3A is an SEM photograph showing a cross-sectional configuration of a negative electrode active material layer including no second negative electrode binder.
Figure 3B:
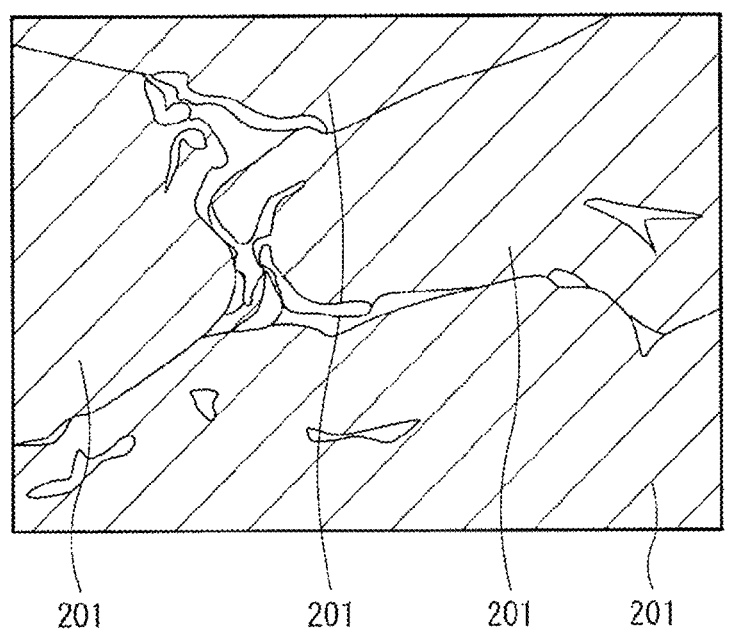
FIG. 3B is a cross-sectional view schematically illustrating a main part of the SEM photograph shown in FIG. 3A.

For comparison, FIG. 3A is a SEM photograph showing a cross-sectional configuration of the negative electrode active material layer 2 including no second negative electrode binder, and FIG. 3B schematically shows a main part of the SEM photograph shown in FIG. 3A.

It should be understood that the negative electrode active material layer 2 shown in FIGS. 3A and 3B has the same configuration as the negative electrode active material layer 2 shown in FIGS. 2A and 2B, except that the second negative electrode binder is not included.

The negative electrode according to an embodiment of the present technology includes the second negative electrode binder. For this reason, when the cross section of the negative electrode active material layer 2 is observed, a plurality of particulate second negative electrode binders 203 are observed together with a plurality of particulate negative electrode active materials 201 as shown in FIGS. 2A and 2B.

The first negative electrode binder mainly coats the respective surfaces of the plurality of negative electrode active materials 201. More specifically, the state of the first negative electrode binder is a film that entirely or partially coats the surface of the negative electrode active material 201. However, because the thickness of the film is extremely small, the first negative electrode binder tends to be difficult to be visually recognized in the SEM photograph.

The plurality of second negative electrode binders 203 are present mainly while being dispersed on the respective surfaces of the plurality of negative electrode active materials, and the negative electrode active materials 201 are bonded to each other with the second negative electrode binder 203 interposed therebetween. Thus, the bonding nature is sufficiently increased between the plurality of negative electrode active materials 201. However, the plurality of the second negative electrode binder is not necessarily required to be dispersed, but may be partially or entirely dense.

In particular, preferably the plurality of second negative electrode binders 203 are partially or entirely present in the gaps between the plurality of negative electrode active materials 201. This is because the plurality of negative electrode active materials 201 is made more likely to be bonded to each other with the plurality of second negative electrode binders 203 interposed therebetween.

The negative electrode according to the comparative example includes no second negative electrode binder. For this reason, when the cross section of the negative electrode active material layer 2 is observed, only a plurality of particulate negative electrode active materials 201 is observed as shown in FIGS. 3A and 3B. It should be understood that the first negative electrode binder tends to be difficult to be visually recognized in the SEM photograph in the same manner as the negative electrode according to an embodiment of the present technology as mentioned above.

The negative electrode according to this comparative example has, as is clear from the comparison between FIGS. 2A and 2B and FIGS. 3A and 3B, no plurality of second negative electrode binders 203, and the plurality of negative electrode active materials 201 is thus bonded to each other without any plurality of second negative electrode binders 203 interposed therebetween. Thus, the bonding nature is not sufficiently increased between the plurality of negative electrode active materials 201.

The mixture proportions of the plurality of negative electrode active materials, the first negative electrode binder, and the plurality of second negative electrode binders are not particularly limited. In particular, when attention is focused on the contents in the negative electrode active material layer 2, the first content 100−X−Y (wt %) of the plurality of negative electrode active materials, the second content X (wt %) of the first negative electrode binder, and the third content Y (wt %) of the plurality of second negative electrode binders preferably satisfy the conditions of: X=about 0.5 wt % to 5 wt % and Y=about 0.5 wt % to 5 wt %. This is because the mixture proportions (proportions by weight) of the negative electrode active material, the first negative electrode binder, and the second negative electrode binder are optimized, thus making the plurality of negative electrode active materials more likely to be fixed to the negative electrode current collector 1 with the first negative electrode binder interposed therebetween, and making the plurality of negative electrode active materials more likely to be bonded to each other with the plurality of second negative electrode binders interposed therebetween.

It should be understood that the negative electrode active material layer 2 may include any one of, or two or more of other negative electrode binders, together with the first negative electrode binder and the second negative electrode binder mentioned above.

The other negative electrode binders may be, for example, any one, or two or more of synthetic rubbers, polymer compounds, and the like. However, the above-mentioned styrene butadiene rubber and derivatives thereof are excluded from the synthetic rubbers described herein. In addition, the above-mentioned polyvinylidene fluoride and derivatives thereof are excluded from the polymer compounds described herein. The synthetic rubbers may be, for example, fluorine-based rubbers, ethylene propylene diene, and the like. The polymer compounds may be, for example, polyacrylic acid, polyimide, and the like.

The negative electrode conductive agent includes, for example, any one of, or two or more of carbon materials and the like, for example. The carbon materials may be, for example, graphite, carbon black, acetylene black, Ketjen black, and the like. It should be understood that the negative electrode conductive agent may be a metal material, a conductive polymer, or the like as long as the agent is a conductive material.

In this regard, the thickness of the negative electrode active material layer 2 including the plurality of negative electrode active materials, the first negative electrode binder, and the plurality of second negative electrode binders is not particularly limited. In particular, the negative electrode active material layer 2 is preferably about 30 μm to 250 μm in thickness. This is because, in the case of using the plurality of negative electrode active materials, the first negative electrode binder, and the plurality of second negative electrode binders, the thickness of the negative electrode active material layer 2 is optimized, thus adequately immobilizing the negative electrode active material layer 2 to the negative electrode current collector 1 through the use of the first negative electrode binder, and adequately bonding the plurality of negative electrode active materials to each other through the use of the second negative electrode binder.

It should be understood that the negative electrode active material layer 2 is formed by any one, or two or more methods such as a coating method, a vapor phase method, a liquid phase method, a thermal spraying method, and a firing method (sintering method). The coating method is, for example, a method of preparing a solution in which a mixture of a plurality of particulate (powdered) negative electrode active materials, a negative electrode binder, and the like is dispersed or dissolved with an organic solvent or the like, and then applying the solution to the negative electrode current collector 1. The vapor phase method may be, for example, a physical deposition method, a chemical deposition method, and the like. More specifically, the vapor phase method may be, for example, a vacuum deposition method, a sputtering method, an ion plating method, a laser ablation method, thermal chemical vapor deposition, a chemical vapor deposition (CVD) method, plasma chemical vapor deposition, and the like. The liquid phase method may be, for example, an electrolytic plating method, an electroless plating method, and the like. The thermal spraying method is a method of spraying a molten or a semi-molten negative electrode active material onto the surface of the negative electrode current collector 1. The firing method is, for example, a method of applying a solution to the negative electrode current collector 1 by a coating method, and then applying a heat treatment to the coating film at a temperature higher than the melting points of the negative electrode binder and the like. This firing method may be, for example, an atmospheric firing method, a reactive firing method, a hot press firing method, and the like.

For example, when the negative electrode is used for a secondary battery, the electrochemical equivalent of the negative electrode active material capable of occluding and releasing the electrode reactant is preferably larger than the electrochemical equivalent of the positive electrode in order to prevent the electrode reactant from being unintentionally deposited at the negative electrode in the process of charging as mentioned above. In addition, when the open-circuit voltage (that is, the battery voltage) in a fully charged case is 4.25 V or higher, the release amount of the electrode reactant per unit mass is increased even with the use of the same positive electrode active material as compared with a case of 4.20 V, and the amount of the positive electrode active material and the amount of the negative electrode active material are thus preferably adjusted accordingly. Thus, a high energy density is achieved.

This negative electrode is manufactured, for example, by the procedure described below according to an embodiment of the present technology.

It should be understood that the respective configurations (formation materials, average particle sizes, mixture proportions, etc.) of the negative electrode active material, the first negative electrode binder, and the second negative electrode binder have already been described in detail, and the descriptions will be thus omitted below.

First, the plurality of particulate negative electrode active materials, the first negative electrode binder, the plurality of particulate second negative electrode binders, and if necessary, a negative electrode conductive agent are mixed, thereby providing a negative electrode combination.

Subsequently, the negative electrode combination is put in an aqueous solvent, the aqueous solvent is then stirred, thereby providing a paste-like negative electrode combination slurry. This aqueous solvent has, for example, any one of, or two or more of pure water and the like.

Finally, the negative electrode combination slurry is applied to both sides of the negative electrode current collector 1, and the negative electrode combination slurry is dried, thereby forming the negative electrode active material layer 2. In the step of forming the negative electrode active material layer 2, the plurality of negative electrode active materials is bonded to the negative electrode current collector 1 with the first negative electrode binder interposed therebetween, and the negative electrode active material layer 2 is thus immobilized to the negative electrode current collector 1. In addition, the plurality of second negative electrode binders is present while being dispersed on the respective surfaces of the plurality of negative electrode active materials, thus providing the plurality of negative electrode active materials bonded with the plurality of second negative electrode binders interposed therebetween.

After that, if necessary, the negative electrode active material layer 2 may be subjected to compression molding with the use of a roll press machine or the like. In this case, the negative electrode active material layer 2 may be heated, or the negative electrode active material layer 2 may be repeatedly subjected to compression molding more than once.

Thus, the negative electrode active material layer 2 is formed on both sides of the negative electrode current collector 1, thereby completing the negative electrode.

For the foregoing negative electrode, the negative electrode active material layer 2 includes the plurality of particulate negative electrode active materials, the first negative electrode binder, and the plurality of particulate second negative electrode binders. The plurality of particulate negative electrode active materials has a relatively large average particle size (=5 μm to 30 μm). The first negative electrode binder contains one or both of a styrene butadiene rubber and a derivative thereof. The plurality of particulate second negative electrode binders contains one or both of polyvinylidene fluoride and a derivative thereof and has a relatively small average particle size (=0.1 μm to 10 μm).

In this case, as mentioned above, the plurality of negative electrode active materials is adequately bonded to the negative electrode current collector 1 with the first negative electrode binder interposed therebetween, and the negative electrode active material layer 2 is thus adequately immobilized to the negative electrode current collector 1. Moreover, the plurality of second negative electrode binders is present while being dispersed on the surface of the negative electrode active material, thus providing the plurality of negative electrode active materials adequately bonded to each other with the plurality of second negative electrode binders interposed therebetween. This makes the negative electrode active material layer 2 less likely to drop off from the negative electrode current collector 1 during the electrode reaction, and makes the negative electrode active material layer 2 less likely to be destroyed. Moreover, the highly reactive negative electrode active material is made less likely to react with the electrolytic solution or the like, and gas derived from the decomposition reaction of the electrolytic solution or the like is made less likely to be generated. Therefore, excellent battery characteristics can be obtained.

In particular, the presence of all or part of the plurality of second negative electrode binders in the gaps between the plurality of negative electrode active materials makes the plurality of negative electrode active materials more likely to be bonded to each other with the plurality of second negative electrode binders interposed therebetween, and a greater effect can be thus obtained.

In addition, as long as the first content 100−X−Y (wt %) of the negative electrode active materials, the second content X (wt %) of the first negative electrode binder, and the third content Y (wt %) of the second negative electrode binders satisfy the conditions of: X=about 0.5 wt % to 5 wt % and Y=about 0.5 wt % to 5 wt %, the plurality of negative electrode active materials is made more likely to be bonded to the negative electrode current collector 1 with the first negative electrode binder interposed therebetween, and the plurality of negative electrode active materials is made more likely to be bonded to each other with the plurality of second negative electrode binders interposed therebetween, and thus, a greater effect can be achieved.

In addition, when the negative electrode active material layer including the negative electrode active material, the first negative electrode binder, and the second negative electrode binder is about 30 μm to 250 μm in thickness, the plurality of negative electrode active materials is made more likely to be bonded to the negative electrode current collector 1 with the first negative electrode binder interposed therebetween, and the plurality of negative electrode active materials is made more likely to be bonded to each other with the plurality of second negative electrode binders interposed therebetween, and thus, a greater effect can be achieved.

Next, a secondary battery will be described which uses the negative electrode according to an embodiment of the present technology as mentioned above.

Figure 4:
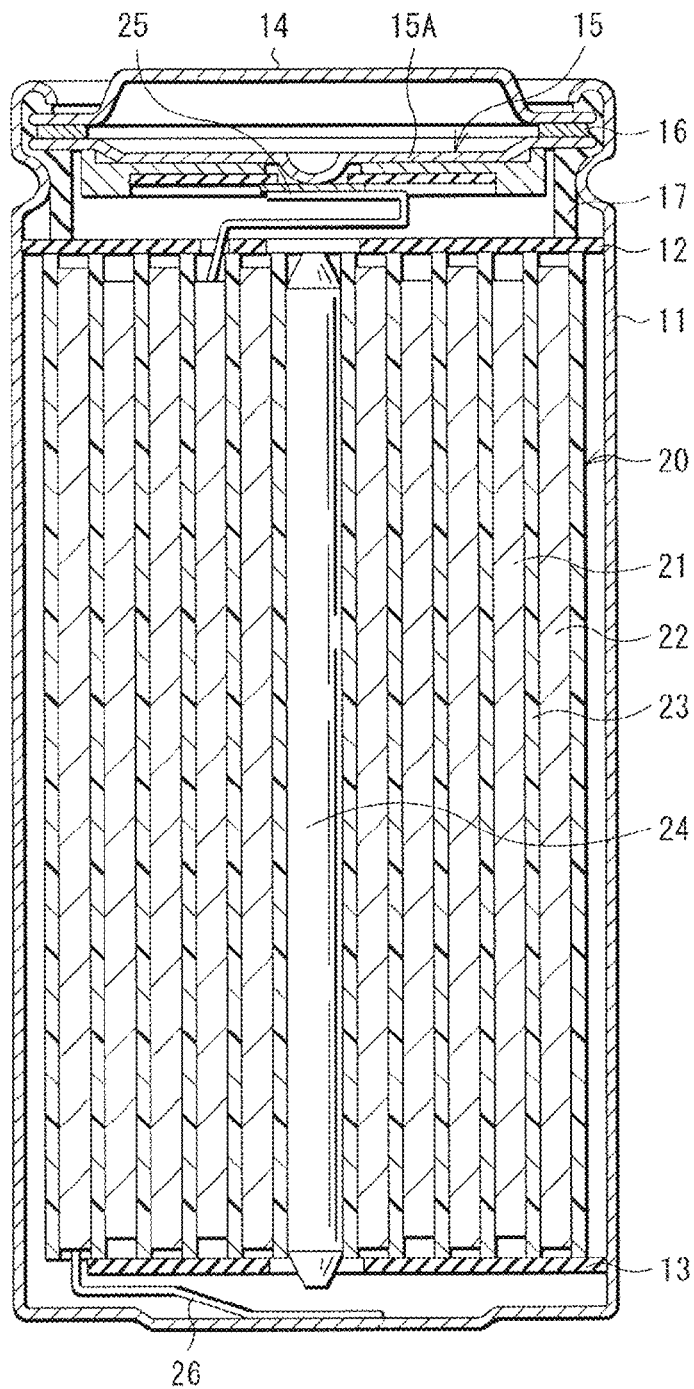
FIG. 4 is a cross-sectional view illustrating the configuration of a secondary battery (cylindrical type) according to an embodiment of the present technology.
Figure 5:
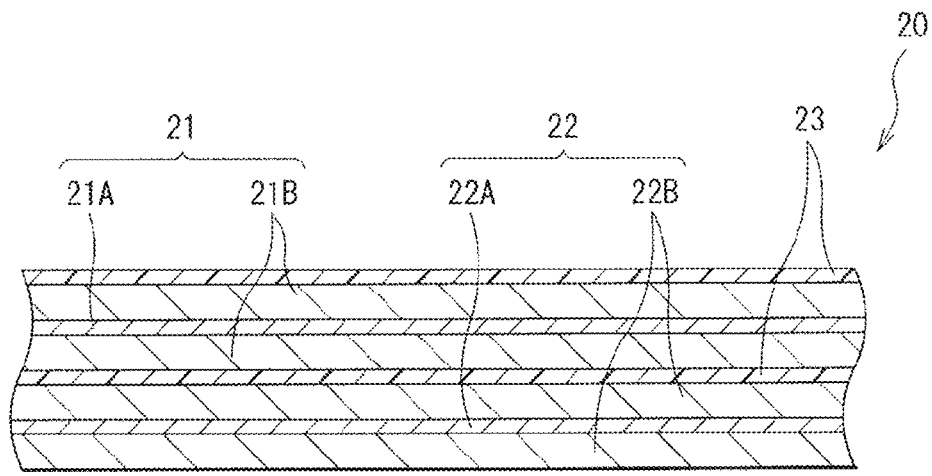
FIG. 5 is a cross-sectional view illustrating the configuration of a part of the wound electrode body shown in FIG. 4.

FIG. 4 shows a cross-sectional configuration of the secondary battery (cylindrical type). FIG. 5 shows a cross-sectional configuration of a part of a wound electrode body 20 shown in FIG. 4.

The secondary battery described herein is, for example, a lithium ion secondary battery that acquires the capacity of a negative electrode 22 through the absorption and release of lithium that is an electrode reactant.

The secondary battery has a cylindrical battery structure according to an embodiment. For this secondary battery, for example, as shown in FIG. 4, a pair of insulating plates 12, 13 and the wound electrode body 20 as a battery element are housed inside a hollow cylindrical battery can 11. For example, a positive electrode 21 and the negative electrode 22 stacked with a separator 23 interposed therebetween are wound for the wound electrode body 20. The wound electrode body 20 is impregnated with, for example, an electrolytic solution which is a liquid electrolyte.

The battery can 11 has, for example, a hollow structure with one end closed and the other end portion open, and contains, any one of, or two or more of iron, aluminum, and alloys thereof, and the like, for example. The surface of the battery can 11 may be plated with nickel or the like. The pair of insulating plates 12, 13 sandwiches the wound electrode body 20, and extends perpendicularly to the wound circumferential surface of the wound electrode body 20.

The open end of the battery can 11 has a battery cover 14, a safety valve mechanism 15, and a thermosensitive resistive element (PTC element) 16 crimped thereto via a gasket 17, thereby making the battery can 11 hermetically sealed. The battery cover 14 includes, for example, the same material as the battery can 11. The safety valve mechanism 15 and the thermosensitive resistive element 16 are each provided inside the battery cover 14, and the safety valve mechanism 15 is electrically connected to the battery cover 14 via the thermosensitive resistive element 16. The safety valve mechanism 15 has a disk plate 15A that is inverted when the internal pressure is equal to or higher than a certain level due to internal short circuit, external heating, or the like, thus disconnecting the electrical connection between the battery cover 14 and the wound electrode body 20. In order to prevent abnormal heat generation due to large current, the electrical resistance of the thermosensitive resistive element 16 increases in response to an increase in temperature. The gasket 17 includes, for example, an insulating material, and asphalt or the like may be applied to the surface of the gasket 17.

For example, a center pin 24 is inserted into the space formed in the winding center of the wound electrode body 20. However, the center pin 24 may be omitted. A positive electrode lead 25 is connected to the positive electrode 21, and a negative electrode lead 26 is connected to the negative electrode 22. The positive electrode lead 25 includes a conductive material such as aluminum, for example. This positive electrode lead 25 is, for example, connected to the safety valve mechanism 15, and electrically connected to the battery cover 14. The negative electrode lead 26 includes a conductive material such as nickel, for example. The negative electrode lead 26 is, for example, connected to the battery can 11, and electrically connected to the battery can 11.

For example, as shown in FIG. 5, the positive electrode 21 includes a positive electrode current collector 21A and a positive electrode active material layer 21B provided on the positive electrode current collector 21A.

It should be understood that the positive electrode active material layer 21B may be provided only on one side of the positive electrode current collector 21A, or provided on both sides of the positive electrode current collector 21A. FIG. 5 shows, for example, a case where the positive electrode active material layer 21B is provided on both sides of the positive electrode current collector 21A.

The positive electrode current collector 21A includes, for example, any one of, or two or more of conductive materials. The types of the conductive materials are not particularly limited, but may be, for example, a metal material such as aluminum, nickel, and stainless steel. This metal material is not limited to a simple substance of metal but may be an alloy. It should be understood that the negative electrode current collector 21B may be a single layer or a multilayer.

The positive electrode active material layer 21B includes, as a positive electrode active material, any one of, or two or more of positive electrode materials capable of occluding and releasing lithium. However, the positive electrode active material layer 21B may further include any one of, or two or more of other materials such as a positive electrode binder and a positive electrode conductive agent.

The positive electrode material preferably has any one of, or two or more of lithium-containing compounds. The type of the lithium-containing compound is not particularly limited, but above all, a lithium-containing composite oxide and a lithium-containing phosphate compound are preferred. This is because a high energy density is obtained.

The "lithium-containing composite oxide" refers to an oxide containing, as a constituent element, any one of, or two or more of lithium and elements other than lithium (hereinafter referred to as "other elements"). The lithium-containing oxide has, for example, any one of, or two or more crystal structures of a layered rock salt type, a spinel type, and the like.

The "lithium-containing phosphate compound" refers to a phosphate compound containing, as a constituent element, any one of, or two or more of lithium and the other elements.

The lithium-containing phosphate compound has, for example, any one of, or two or more crystal structures of an olivine type and the like.

The types of the other elements are not particularly limited as long as the elements correspond to any one of, or two or more of optional elements (excluding lithium). Above all, the other elements preferably correspond to any one of, or two or more of the elements that belong to Groups 2 to 15 in the long-periodic table. More specifically, the other elements more preferably correspond to any one of, or two or more metal elements of nickel, cobalt, manganese, iron, and the like. This is because a high voltage is achieved.

The lithium-containing composite oxide that has a layered rock salt-type crystal structure may be, for example, compounds represented by each of the following formulas (1) to (3).

$$Li_aMn_{(1-b-c)}Ni_bM1_cO_{(2-d)}F_e \quad (1)$$

(M1 represents at least one of cobalt, magnesium, aluminum, boron, titanium, vanadium, chromium, iron, copper, zinc, zirconium, molybdenum, tin, calcium, strontium and tungsten. a to e satisfy $0.8 \leq a \leq 1.2$, $0 < b < 0.5$, $0 \leq c \leq 0.5$, $(b+c) < 1$, $-0.1 \leq d \leq 0.2$, and $0 \leq e \leq 0.1$. However, the lithium composition varies depending on the charge/discharge condition, and a refers to the value in a full discharge condition.)

$$Li_aNi_{(1-b)}M2_bO_{(2-c)}F_d \quad (2)$$

(M2 represents at least one of cobalt, manganese, magnesium, aluminum, boron, titanium, vanadium, chromium, iron, copper, zinc, molybdenum, tin, calcium, strontium and tungsten. a to d satisfy $0.8 \leq a \leq 1.2$, $0.005 \leq b \leq 0.5$, $-0.1 \leq c \leq 0.2$, and $0 \leq d \leq 0.1$. However, the lithium composition varies depending on the charge/discharge condition, and a refers to the value in a full discharge condition.)

$$Li_aCo_{(1-b)}M3_bO_{(2-c)}F_d \quad (3)$$

(M3 represents at least one of nickel, manganese, magnesium, aluminum, boron, titanium, vanadium, chromium, iron, copper, zinc, molybdenum, tin, calcium, strontium and tungsten. a to d satisfy $0.8 \leq a \leq 1.2$, $0 \leq b < 0.5$, $-0.1 \leq c \leq 0.2$, and $0 \leq d \leq 0.1$. However, the lithium composition varies depending on the charge/discharge condition, and a refers to the value in a full discharge condition.)

The lithium-containing composite oxide that has a layered rock salt-type crystal structure may be, for example, LiNiO$_2$, LiCoO$_2$, LiCo$_{0.98}$Al$_{0.01}$Mg$_{0.01}$O$_2$, LiNi$_{0.5}$Co$_{0.2}$Mn$_{0.3}$O$_2$, LiNi$_{0.8}$Co$_{0.15}$Al$_{0.05}$O$_2$, LiNi$_{0.33}$Co$_{0.33}$Mn$_{0.33}$O$_2$, Li$_{1.2}$Mn$_{0.52}$Co$_{0.175}$Ni$_{0.1}$O$_2$, and Li$_{1.15}$(Mn$_{0.65}$Ni$_{0.22}$Co$_{0.13}$)O$_2$.

It should be understood that when the lithium-containing composite oxide that has a layered rock salt-type crystal structure contains nickel, cobalt, manganese and aluminum as constituent elements, the atomic ratio of the nickel is preferably 50 atomic % or more. This is because a high energy density is obtained.

The lithium-containing composite oxide that has a spinel-type crystal structure may be, for example, compounds represented by the following formula (4).

$$Li_aMn_{(2-b)}M4_bO_cF_d \quad (4)$$

(M4 represents at least one of cobalt, nickel, magnesium, aluminum, boron, titanium, vanadium, chromium, iron, copper, zinc, molybdenum, tin, calcium, strontium and tungsten. a to d satisfy $0.9 \leq a \leq 1.1$, $0 \leq b \leq 0.6$, $3.7 \leq c \leq 4.1$, and $0 \leq d \leq 0.1$. However, the lithium composition varies depending on the charge/discharge condition, and a refers to the value in a full discharge condition.)

The lithium-containing composite oxide that has a spinel-type crystal structure may be, for example, LiMn$_2$O$_4$ and the like.

The lithium-containing phosphate compound that has an olivine-type crystal structure may be, for example, compounds represented by the following formula (5).

$$Li_aM5PO_4 \quad (5)$$

(M5 represents at least one of cobalt, manganese, iron, nickel, magnesium, aluminum, boron, titanium, vanadium, niobium, copper, zinc, molybdenum, calcium, strontium, tungsten and zirconium. a satisfies $0.9 \leq a \leq 1.1$. However, the lithium composition varies depending on the charge/discharge condition, and a refers to the value in a full discharge condition.)

The lithium-containing phosphate compound that has an olivine-type crystal structure may be LiFePO$_4$, LiMnPO$_4$, LiFe$_{0.5}$Mn$_{0.5}$PO$_4$, LiFe$_{0.3}$Mn$_{0.7}$PO$_4$, and the like.

It should be understood that the lithium-containing composite oxide may be compounds represented by the following formula (6).

$$(Li_2MnO_3)_x(LiMnO_2)_{1-x} \quad (6)$$

(x satisfies $0 \leq x \leq 1$)

Besides, the positive electrode material may be, for example, oxides, disulfides, chalcogenides, conductive polymers, and the like. The oxides may be, for example, a titanium oxide, a vanadium oxide, a manganese dioxide, and the like. The disulfides may be, for example, a titanium disulfide, a molybdenum sulfide, and the like. The chalcogenides may be, for example, a niobium selenide and the like. The conductive polymers may be, for example, sulfur, polyaniline, polythiophene, and the like.

The positive electrode binder includes any one of, or two or more of synthetic rubbers and polymer compounds, for example. The synthetic rubbers may be, for example, styrene-butadiene rubbers, fluorine rubbers, ethylene propylene diene, and the like. The polymeric compounds may be, for example, polyvinylidene fluoride, polyacrylic acid, polyimide, and the like.

Regarding the positive electrode conductive agent, for example, the same applies as details concerning the negative electrode conductive agent as described herein.

The negative electrode 22 has, for example, the same configuration as the negative electrode according to an embodiment of the present technology as described herein. More specifically, for example, as shown in FIG. 5, the negative electrode 22 includes a negative electrode current collector 22A and a negative electrode active material layer 21B provided on the negative electrode current collector 21A. The negative electrode current collector 21A and negative electrode active material layer 21B respectively have the same configurations as those of the negative electrode current collector 1 and the negative electrode active material layer 2.

The separator 23 is disposed between the positive electrode 21 and the negative electrode 22. Thus, the separator 23 is intended to separate the positive electrode 21 and the negative electrode 22, and allow passage of lithium ions while preventing a short circuit due to the current caused by the contact between the positive electrode 21 and the negative electrode 22.

The separator 23 includes any one of, or two or more of porous membranes such as synthetic resins and ceramics, for example, and may be a laminated film of two or more porous membranes. The synthetic resins may be, for example, polytetrafluoroethylene, polypropylene, polyethylene, and the like.

It should be understood that the separator 23 may include, for example, the above-mentioned porous film (base material layer), and a polymer compound layer provided on the base material layer. This is because the adhesion of the separator 23 to each of the positive electrode 21 and the negative electrode 22 is improved, thus making the wound electrode body 20 unlikely to warp. Thus, the inhibited decomposition reaction of the electrolytic solution, and also, the suppressed leakage of the electrolytic solution with which the base material layer impregnated, make the electric resistance less likely to increase even with repeated charging/discharging, and make the secondary battery less likely to swell.

The polymer compound layer may be provided only on one side of the base material layer, or provided on both sides of the base material layer. This polymer compound layer includes any one of, or two or more of polymer materials such as polyvinylidene fluoride, for example. This is because polyvinylidene fluoride is excellent in physical strength, and electrochemically stable. In the case of forming the polymer compound layer, for example, a solution in which a polymer material is dissolved with an organic solvent or the like is applied to the base material layer, and then the base material layer is dried. It should be understood that after immersing the base material layer in the solution, the base material layer may be dried.

The electrolytic solution includes, for example, any one of, or two or more of solvents, and any one of, or two or more of electrolyte salts. Further, the electrolytic solution may further include any one of, or two or more of various materials such as additives.

The solvent includes a nonaqueous solvent such as an organic solvent. The electrolytic solution including a nonaqueous solvent is a so-called nonaqueous electrolytic solution.

Specifically, the solvent is, for example, a cyclic carbonate, a chain carbonate, a lactone, a chain carboxylate, a nitrile (mononitrile), or the like. This is because excellent battery capacity, cycle characteristics, storage characteristics, and the like are achieved.

The cyclic carbonate may be, for example, ethylene carbonate, propylene carbonate, butylene carbonate, and the like. The chain carbonate may be, for example, dimethyl carbonate, diethyl carbonate, ethyl methyl carbonate, methyl propyl carbonate, and the like. The lactone may be, for example, γ-butyrolactone, γ-valerolactone, and the like. The chain carboxylate may be, for example, methyl acetate, ethyl acetate, methyl propionate, ethyl propionate, propyl propionate, methyl butyrate, methyl isobutyrate, methyl trimethylacetate, and ethyl trimethylacetate. The nitrile may be, for example, acetonitrile, methoxyacetonitrile, 3-methoxypropionitrile, and the like.

Besides, the solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, dimethylsulfoxide and the like. This is because similar advantages are obtained.

Above all, any one of, or two or more of carbonate esters such as ethylene carbonate, propylene carbonate, dimethyl carbonate, diethyl carbonate, and ethyl methyl carbonate are preferred. This is because better battery capacity, cycle characteristics, storage characteristics, and the like are achieved.

In this case, it is more preferable to combine a high-viscosity (high dielectric constant) solvent (for example, relative permittivity ε≥30) which is a cyclic carbonate such as ethylene carbonate and propylene carbonate with a low-viscosity solvent (for example, viscosity 1 mPa·s) which is a chain carbonate such as dimethyl carbonate, ethyl methyl carbonate, and diethyl carbonate. This is because the dissociation and ion mobility of the electrolyte salt are improved.

In addition, the solvent may be an unsaturated cyclic carbonate, a halogenated carbonate ester, a sulfonic acid ester, an acid anhydride, a dinitrile compound, a diisocyanate compound, or the like. This is because the chemical stability of the electrolytic solution is improved, thus inhibiting the decomposition reaction of the electrolytic solution and the like.

The unsaturated cyclic carbonate refers to a cyclic carbonate having one or more unsaturated bonds (carbon-carbon double bonds). This unsaturated cyclic carbonate may be, for example, vinylene carbonate(1,3-dioxole-2-one), vinyl ethylene carbonate(4-vinyl-1,3-dioxolane-2-one), methylene ethylene carbonate(4-methylene-1,3-dioxolan-2-one), and the like. The content of the unsaturated cyclic carbonate in the solvent is not particularly limited, but for example, 0.01 wt % to 10 wt %.

The halogenated carbonate ester refers to a cyclic or chain carbonate ester containing one or more types of halogen as constituent elements. The type of the halogen is not particularly limited, but for example, any one, or two or more of fluorine, chlorine, bromine and iodine. The cyclic halogenated carbonate ester may be, for example, 4-fluoro-1,3-dioxolan-2-one, 4,5-difluoro-1,3-dioxolan-2-one, and the like. The chain halogenated carbonate ester may be, for example, fluoromethyl methyl carbonate, bis(fluoromethyl) carbonate, difluoromethyl methyl carbonate, and the like. The content of the halogenated carbonate ester in the solvent is not particularly limited, but for example, 0.01 wt % to 50 wt %.

The sulfonates may be, for example, monosulfonates, disulfonates, and the like. The monosulfonates may be cyclic monosulfonates or chain monosulfonates. The cyclic monosulfonates may be, for example, sultones such as 1,3-propane sultone and 1,3-propene sultone. The chain monosulfonates may be, for example, compounds with a cyclic monosulfonate broken in the middle. The disulfonates may be cyclic disulfonates or chain disulfonates. The content of the sulfonate in the solvent is not particularly limited, but for example, 0.5 wt % to 5 wt %.

The acid anhydride may be, for example, a carboxylic acid anhydride, a disulfonic acid anhydride, a carboxylic sulfonic acid anhydride, and the like. The carboxylic acid anhydride may be, for example, a succinic anhydride, a glutaric anhydride, a maleic anhydride, and the like. The disulfonic acid anhydride may be, for example, an ethanedisulfonic anhydride, a propanedisulfonic anhydride, and the like. The carboxylic sulfonic acid anhydride may be, for example, a sulfobenzoic anhydride, a sulfopropionic anhydride, a sulfobutyric anhydride, and the like. The content of the acid anhydride in the solvent is not particularly limited, but for example, 0.5 wt % to 5 wt %.

The dinitrile compound is, for example, a compound represented by NC—$C_mH_{2m}$—CN (m is an integer of 1 or more). This dinitrile compound may be, for example, succinonitrile (NC—$C_2H_4$—CN), glutaronitrile (NC—$C_3H_6$—CN), adiponitrile (NC—$C_4H_8$—CN), and the like. In addition, the dinitrile compound may be, for example, a compound represented by, for example, NC—R1—CN (R1 is an arylene group). This dinitrile compound may be, for example, phthalonitrile (NC—$C_6H_4$—CN) and the like. The content of the dinitrile compound in the solvent is not particularly limited, but, for example, 0.5 wt % to 5 wt %.

The diisocyanate compound is, for example, a compound represented by OCN—$C_nH_{2n}$—NCO (n is an integer of 1 or more). This diisocyanate compound may be, for example, OCN—$C_6H_{12}$—NCO and the like. The content of the diisocyanate compound in the solvent is not particularly limited, but, for example, 0.5 wt % to 5 wt %.

The electrolyte salt includes any one of, or two or more of lithium salts, for example. However, the electrolyte salt may contain a salt other than lithium salts, for example. The salt other than lithium may be, for example, salts of light metals other than lithium.

The lithium salt may be, for example, lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl) and Lithium bromide (LiBr), and the like. This is because excellent battery capacity, cycle characteristics, storage characteristics, and the like are achieved.

Above all, any one of, or two or more of lithium hexafluorophosphate, lithium tetrafluoroborate, lithium perchlorate, and lithium hexafluoroarsenate is preferred, and lithium hexafluorophosphate is more preferred. This is because the internal resistance is lowered, thus achieving a greater effect.

The content of the electrolyte salt is not particularly limited, but preferably 0.3 mol/kg to 3.0 mol/kg with respect to the solvent. This is because a high ion conductivity is achieved.

This secondary battery operates as follows, for example.

For charging, lithium ions are released from the positive electrode 21, and the lithium ions are occluded in the negative electrode 22 through the electrolytic solution. On the other hand, for discharging, lithium ions are released from the negative electrode 22, and the lithium ions are occluded in the positive electrode 21 through the electrolytic solution.

This secondary battery is manufactured, for example, by the following procedure according to an embodiment.

In the case of preparing the positive electrode 21, first, a positive electrode active material, a positive electrode binder, a positive electrode conductive agent, and the like are mixed to prepare a positive electrode combination. Subsequently, the positive electrode combination is dispersed in an organic solvent or the like, thereby providing a paste-like positive electrode combination slurry. Finally, the positive electrode combination slurry is applied to both sides of the positive electrode current collector 21A, and the positive electrode combination slurry is dried, thereby forming the positive electrode active material layer 21B. After that, the positive electrode active material layer 21B may be subjected to compression molding with the use of a roll press machine or the like. In this case, the positive electrode active material layer 21B may be heated, or compression molding may be repeated more than once.

In the case of preparing the negative electrode 22, the negative electrode active material layer 22B is formed on both sides of the negative electrode current collector 22A by the same procedure as the above-mentioned procedure for manufacturing the negative electrode.

In the case of assembling the secondary battery, the positive electrode lead 25 is connected to the positive electrode current collector 21A by the use of a welding method or the like, and the negative electrode lead 26 is connected to the negative electrode current collector 22A by the use of a welding method or the like. Subsequently, the wound electrode body 20 is formed by winding the positive electrode 21 and the negative electrode 22 stacked with the separator 23 interposed therebetween. Subsequently, the center pin 24 is inserted into the space formed in the winding center of the wound electrode body 20.

Subsequently, while the wound electrode body 20 is sandwiched by the pair of insulating plates 12, 13, the wound electrode body 20 is housed inside the battery can 11. In this case, the positive electrode lead 25 is connected to the safety valve mechanism 15 by the use of a welding method or the like, and the negative electrode lead 26 is connected to the battery can 11 by the use of a welding method or the like. Subsequently, an electrolytic solution is injected into the inside of the battery can 11, thereby impregnating the wound electrode body 20 with the electrolytic solution. Finally, the battery cover 14, the safety valve mechanism 15, and thermosensitive resistive element 16 are crimped to the opening end of the battery can 11 via the gasket 17.

Thus, a cylindrical secondary battery is completed.

According to this secondary battery, the negative electrode 22 has the same configuration as the negative electrode according to an embodiment of the present technology as described above, thus preventing the negative electrode active material layer 22B from dropping off and being destroyed during charging/discharging, and the generation of gas due to decomposition reaction of the electrolytic solution or the like. Therefore, excellent battery characteristics can be obtained.

Other actions and effects are the same as the case described with reference to the negative electrode according to an embodiment of the present technology as mentioned above.

Figure 6:
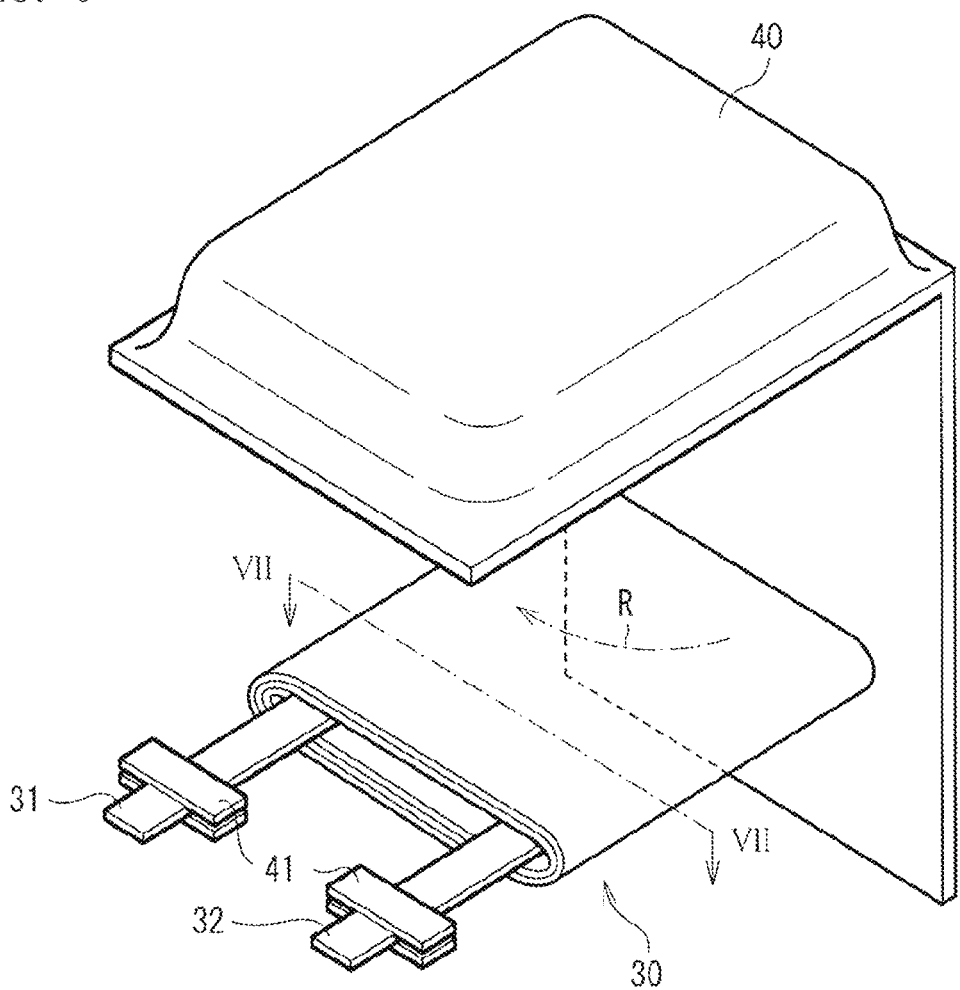
FIG. 6 is a perspective view illustrating the configuration of another secondary battery (laminate film type) according to an embodiment of the present technology.
Figure 7:
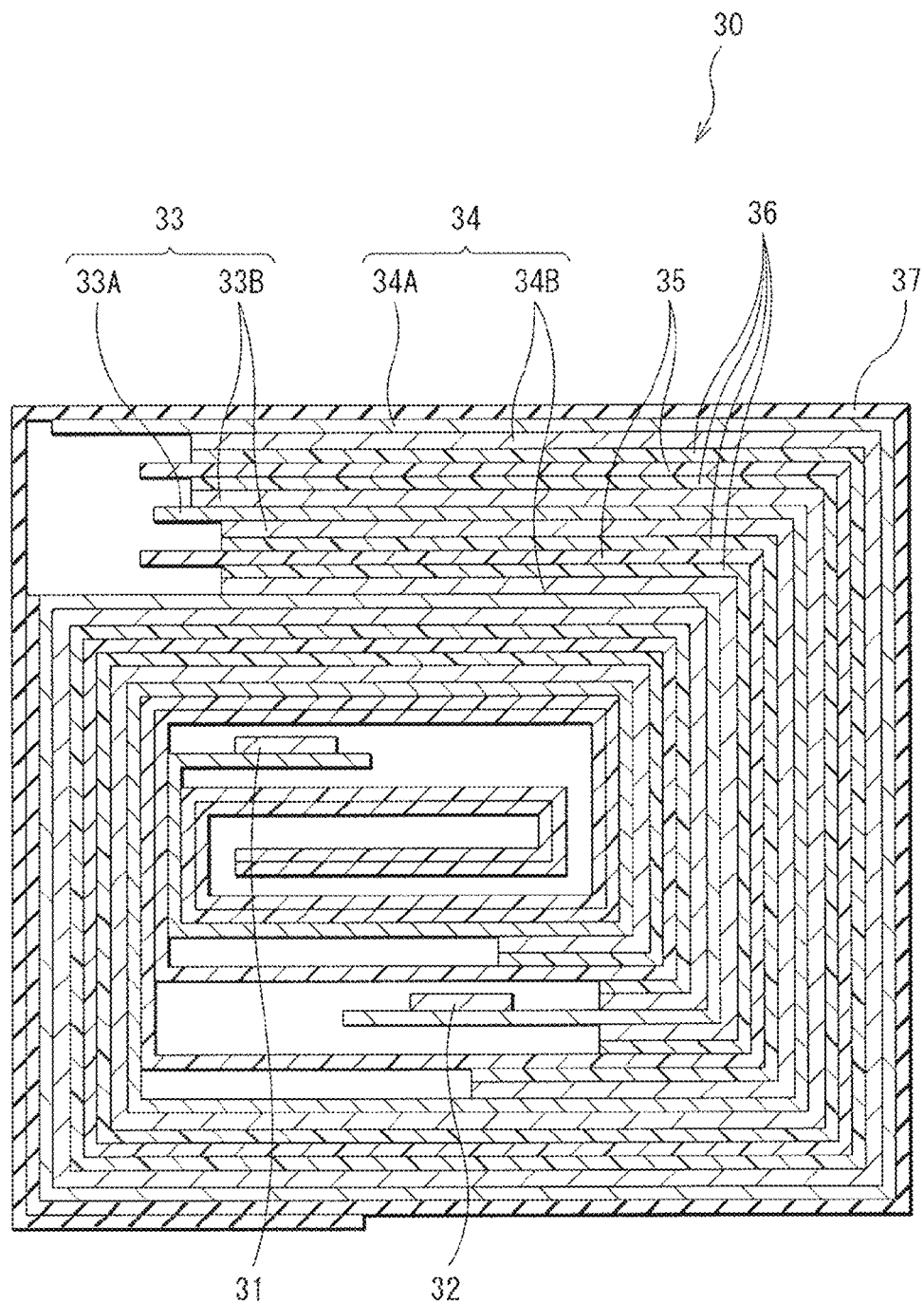
FIG. 7 is a cross-sectional view of a wound electrode body along the line VII-VII shown in FIG. 6.

FIG. 6 shows a perspective configuration of another secondary battery according to an embodiment. FIG. 7 shows a cross section of a wound electrode body 30 along the line VII-VII shown in FIG. 6. It should be understood that FIG. 6 shows the wound electrode body 30 and an exterior member 40 separated from each other.

In the following description, the constituent elements of the cylindrical secondary battery already described will be quoted occasionally.

The secondary battery includes a lithium ion secondary battery that has a battery structure of laminate film type. For this secondary battery, for example, as shown in FIG. 6, the wound electrode body 30, which is a battery element, is housed inside the film-shaped exterior member 40 with flexibility. For the wound electrode body 30, for example, a positive electrode 33 and a negative electrode 34 are stacked with the separator 35 and the electrolyte layer 36 interposed therebetween, and the stacked object is wound. A positive electrode lead 31 is connected to the positive electrode 33, and a negative electrode lead 32 is connected to the negative electrode 34. The outermost circumferential part of the wound electrode body 30 is protected by a protective tape 37.

The positive electrode lead 31 and the negative electrode lead 32 are each led out, for example, from the inside of the exterior member 40 toward the outside in the same direction. The positive electrode lead 31 includes any one of, or two or more of conductive materials such as aluminum, for example. The negative electrode lead 32 includes any one, two or more of conductive materials such as copper, nickel and stainless steel, for example. These conductive materials have the form of, for example, a thin plate or a net.

The exterior member 40 is, for example, a single film that can be folded in the direction of the arrow R shown in FIGS. 6 and 7, and a part of the exterior member 40 is provided with a recess for housing the wound electrode body 30. The exterior member 40 is, for example, a laminate film of a fusion layer, a metal layer, and a surface protective layer laminated in this order. In the process of manufacturing a secondary battery, the exterior member 40 is folded so that the fusion layers are opposed to each other with the wound electrode body 30 interposed therebetween, and outer circumferential edges of the fusion layers are subjected to fusion bonding to each other. However, the exterior member 40 may have two laminate films bonded to each other with an adhesive. The fusion layer includes any one of, or two or more of films such as polyethylene and polypropylene, for example. The metal layer includes any one of, or two or more of, for example, aluminum foil and the like. The surface protective layer includes any one of, or two or more of films such as nylon and polyethylene terephthalate, for example.

Above all, the exterior member 40 is preferably an aluminum laminate film of a polyethylene film, an aluminum foil, and a nylon film laminated in this order. However, the exterior member 40 may be a laminate film that has another laminated structure, a polymer film such as polypropylene, or a metallic film.

Between the exterior member 40 and the positive electrode lead 31, for example, an adhesive film 41 is inserted for preventing the intrusion of outside air. In addition, between the exterior member 40 and the negative electrode lead 32, for example, the adhesive film 41 mentioned above is inserted. The adhesive film 41 contains any one, two or more of materials that have adhesiveness to both the positive electrode lead 31 and the negative electrode lead 32. The materials with adhesiveness include, for example, polyolefin resins, and more specifically, polyethylene, polypropylene, modified polyethylene, and modified polypropylene.

The positive electrode 33 includes, for example, a positive electrode current collector 33A and a positive electrode active material layer 33B. The negative electrode 34 includes a negative electrode current collector 34A and a negative electrode active material layer 34B. The positive electrode current collector 33A, the positive electrode active material layer 33B, the negative electrode current collector 34A, and the negative electrode active material layer 34B respectively have, for example, the same configurations as the respective configurations of the positive electrode current collector 21A, the positive electrode active material layer 21B, the negative electrode current collector 22A, and the negative electrode active material layer 22B. The configuration of the separator 35 is, for example, the same as that of the separator 23.

The electrolyte layer 36 includes an electrolytic solution and a polymer compound. This electrolytic solution has the same composition as the electrolytic solution used for the cylindrical secondary battery mentioned above. The electrolyte layer 36 described herein is a so-called gel-like electrolyte, and in the electrolyte layer 36, the electrolytic solution is held by the polymer compound. This is because a high ion conductivity (for example, 1 mS/cm or more at room temperature) is achieved, and leakage of the electrolytic solution is prevented. It should be understood that the electrolyte layer 36 may further include any one of, or two or more of other materials such as additives.

The polymer compound includes one or more of homopolymers and copolymers, and the like. The homopolymers may be, for example, polyacrylonitrile, polyvinylidene fluoride, polytetrafluoroethylene, polyhexafluoropropylene, a polyethylene oxide, a polypropylene oxide, polyphosphazene, polysiloxane, polyvinyl fluoride, polyvinyl acetate, polyvinyl alcohol, polymethyl methacrylate, a polyacrylic acid, a polymethacrylic acid, a styrene-butadiene rubber, a nitrile-butadiene rubber, polystyrene, and polycarbonate. The copolymers include, for example, a copolymer of vinylidene fluoride and hexafluoropyrene. Above all, the homopolymer is preferably polyvinylidene fluoride, and the copolymer is preferably a copolymer of vinylidene fluoride and hexafluoropyrene. This is because of electrochemical stability.

In the electrolyte layer 36 which is a gel-like electrolyte, the "solvent" included in the electrolytic solution refers to a broad concept that encompasses not only liquid materials, but also materials that have ion conductivity, capable of dissociating electrolyte salts. For this reason, in the case of using a polymer compound that has ion conductivity, the polymer compound is also included in the solvent.

It should be understood that instead of the electrolyte layer 36, the electrolytic solution may be used as it is. In this case, the wound electrode body 30 is impregnated with the electrolytic solution.

This secondary battery operates as follows, for example, according to an embodiment.

For charging, lithium ions are released from the positive electrode 33, and the lithium ions are occluded in the negative electrode 34 through the electrolyte layer 36. On the other hand, for discharging, lithium ions are released from the negative electrode 34, and the lithium ions are occluded in the positive electrode 33 through the electrolyte layer 36.

The secondary battery including the gel-like electrolyte layer 36 is manufactured by, for example, the following three kinds of procedures.

In accordance with the first procedure, the positive electrode 33 and the negative electrode 34 are prepared by the same manufacturing procedure as that for the positive electrode 21 and the negative electrode 22. Specifically, in the case of preparing the positive electrode 33, the positive electrode active material layer 33B is formed on both sides of the positive electrode current collector 33A, and in the case of preparing the negative electrode 34, the negative electrode active material layer 34B is formed on both sides of the negative electrode current collector 34A. Subsequently, a precursor solution is prepared by mixing an electrolytic solution, a polymer compound, an organic solvent, and the like. Subsequently, after applying the precursor solution to the positive electrode 33, the precursor solution is dried to form the gel-like electrolyte layer 36. In addition, after applying the precursor solution to the negative electrode 34, the precursor solution is dried to form the gel-like electrolyte layer 36. Subsequently, the positive electrode lead 31 is connected to the positive electrode current collector 33A by the use of a welding method or the like, and the negative electrode lead 32 is connected to the negative electrode current collector 34A by the use of a welding method or the like. Subsequently, the wound electrode body 30 is formed by winding the positive electrode 33 and the negative electrode 34 stacked with the separator 35 and the electrolyte layer 36 interposed therebetween. Subsequently, the protective tape 37 is attached to the outermost circumferential part of the wound electrode body 30. Subsequently, the exterior member 40 is folded so as to sandwich the wound electrode body 30 therebetween, and outer circumferential edges of the exterior member 40 are then bonded to each other by the use of a thermal fusion method or the like, thereby housing the wound electrode body 30 inside the exterior member 40. In this case, the adhesive film 41 is inserted between the positive electrode lead 31 and the exterior member 40, and the adhesive film 41 is inserted between the negative electrode lead 32 and the exterior member 40.

In accordance with the second procedure, the positive electrode lead 31 is connected to the positive electrode 33 by a welding method or the like, and the negative electrode lead 32 is connected to the negative electrode 34 by a welding method or the like. Subsequently, the positive electrode 33 and the negative electrode 34 with the separator 35 interposed therebetween are wound to form a wound body as a precursor for the wound electrode body 30. Subsequently, the protective tape 37 is attached to the outermost peripheral part of the wound body. Subsequently, the exterior member 40 is folded so as to sandwich the wound electrode body 30 therebetween, and remaining outer circumferential edges of the exterior member 40 excluding one outer circumferential edge thereof are then bonded by the use of a thermal fusion method or the like, thereby housing the wound body inside the pouch-shaped exterior member 40. Subsequently, a composition for an electrolyte is prepared by mixing an electrolytic solution, a monomer that is a raw material for a polymer compound, a polymerization initiator, and if necessary, other materials such as a polymerization inhibitor. Subsequently, the composition for the electrolyte is injected into the pouch-shaped exterior member 40, and then the exterior member 40 is sealed with the use of a thermal fusion method or the like. Subsequently, the monomer is subjected to thermal polymerization to form the polymer compound. Thus, the electrolytic solution is held by the polymer compound, thereby forming the gel-like electrolyte layer 36.

In accordance with the third procedure, except for the use of the separator 35 with a polymer compound layer formed on a porous membrane (base material layer), a winding body is prepared by the same procedure as the second procedure mentioned above, and the wound body is then housed inside the pouch-shaped exterior member 40. Subsequently, an electrolytic solution is injected into the exterior member 40, and the opening of the exterior member 40 is sealed by the use of a thermal fusion method or the like. Subsequently, the exterior member 40 is heated while applying a load to the exterior member 40, thereby bringing the separator 35 into close contact with the positive electrode 33 with the polymer compound layer interposed therebetween, and bringing the separator 35 into close contact with the negative electrode 34 with the polymer compound layer interposed therebetween. Thus, the polymer compound layer is impregnated with the electrolytic solution, and the polymer compound layer turns into a gel, thus resulting in the formation of the electrolyte layer 36.

In accordance with this third procedure, the secondary battery is made less likely to swell as compared with the first procedure. In addition, in accordance with the third procedure, as compared with the second procedure, the solvent and the monomer (raw materials for the polymer compound), and the like hardly remain in the electrolyte layer 36, the step of forming the polymer compound is thus favorably controlled. Therefore, the positive electrode 33, the negative electrode 34, and the separator 35 are each adequately brought in close contact with the electrolyte layer 36.

According to this secondary battery, the negative electrode 34 has the same configuration as the negative electrode according to an embodiment of the present technology as described herein, thus preventing the negative electrode active material layer 34B from dropping off and being destroyed during charging/discharging, and the generation of gas due to decomposition reaction of the electrolytic solution or the like. Therefore, excellent battery characteristics can be obtained.

In particular, in the laminate film-type secondary battery, as mentioned above, the wound electrode body 30 including the positive electrode 33, the negative electrode 34, and the electrolyte layer 36 is housed inside the flexible film-shaped exterior member 40. Accordingly, when gas is generated due to the decomposition reaction of the electrolytic solution or the like, the secondary battery tends to swell easily. However, when the negative electrode 34 has the same configuration as the negative electrode according to an embodiment of the present technology, gas due to the decomposition reaction of the electrolytic solution or the like is made less likely to be generated, thus making the secondary battery less likely to swell even when the flexible film-shaped exterior member 40 is used. Therefore, in the laminate film-type secondary battery which is likely to swell apparently, the swelling thereof can be suppressed effectively.

Other actions and effects are the same as the case described with reference to the negative electrode according to an embodiment of the present technology as mentioned above.

Next, application examples of the above-described secondary battery will be described.

The application of the secondary battery is not particularly limited, as long as the secondary battery is applied to machines, devices, instruments, apparatuses, systems, and the like (assembly of multiple devices or the like) that can use the secondary battery as a driving power supply, a power storage source for reserve of power, or the like. The secondary battery for use as a power supply may be served as a main power supply or an auxiliary power supply. The main power supply is a power supply that is used preferentially, regardless of the presence or absence of other power supplies. The auxiliary power supply may be, for example, a power supply which is used instead of the main power supply, or a power supply which is switched from the main power supply as necessary. When the secondary battery is used as an auxiliary power supply, the type of the main power supply is not limited to the secondary battery.

Here are applications of the secondary battery, for example: electronic devices (including portable electronic devices) such as video cameras, digital still cameras, cellular phones, laptop personal computers, cordless telephones, headphone stereos, portable radios, portable televisions, and portable information terminals; portable life instruments such as electric shavers; storage devices such as backup power supplies and memory cards; power tools such as electric drills and electric saws; battery packs mounted on notebook-type personal computers or the like as a detachable power supply; medical electronic devices such as pacemakers and hearing aids; electric vehicles such as electric cars (including hybrid cars); and power storage systems such as a domestic battery system that stores electric power in preparation for emergency or the like. Of course, the application of the secondary battery may be any other application than the foregoing.

Above all, it is effective to apply the secondary battery to a battery pack, an electric vehicle, a power storage system, a power tool, an electronic device, or the like. This is because, since these application require excellent battery characteristics, the use of the secondary battery according to the present technology can improve the performance in an effective manner. It should be understood that the battery pack is a power supply that uses a secondary battery. As will be described later, this battery pack may use a unit cell or an assembled battery. The electric vehicle is a vehicle that operates (travels) with the secondary battery as a driving power supply, and may be a vehicle (a hybrid car or the like) also provided with a driving source other than the secondary battery as mentioned above. The power storage system is a system using a secondary battery as a power storage source. For example, for a household power storage system, electric power is stored in the secondary battery which serves as a power storage source, thus making it possible to use home electric appliances and the like through the use of electric power. The power tool is a tool which makes a movable part (such as a drill, for example) movable with the secondary battery as a driving power supply. The electronic device is a device that performs various functions with the secondary battery as a driving power supply (power supply source).

In this regard, some application examples of the secondary battery will be specifically described. It should be understood that the configuration of each application example described below is just considered by way of example, and the configuration of the application example can be thus changed appropriately.

Figure 8:
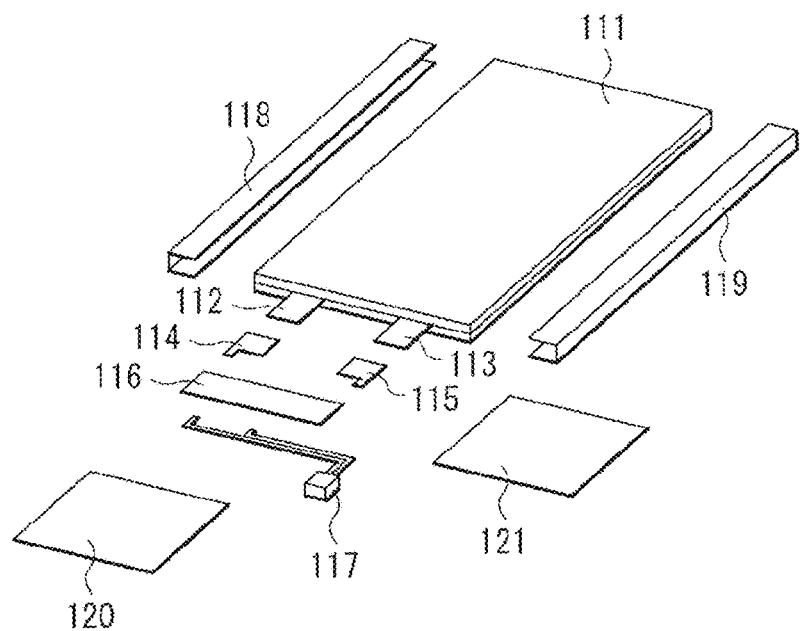
FIG. 8 is a perspective view illustrating the configuration of an application example (battery pack: unit cell) of a secondary battery according to an embodiment of the present technology.
Figure 9:
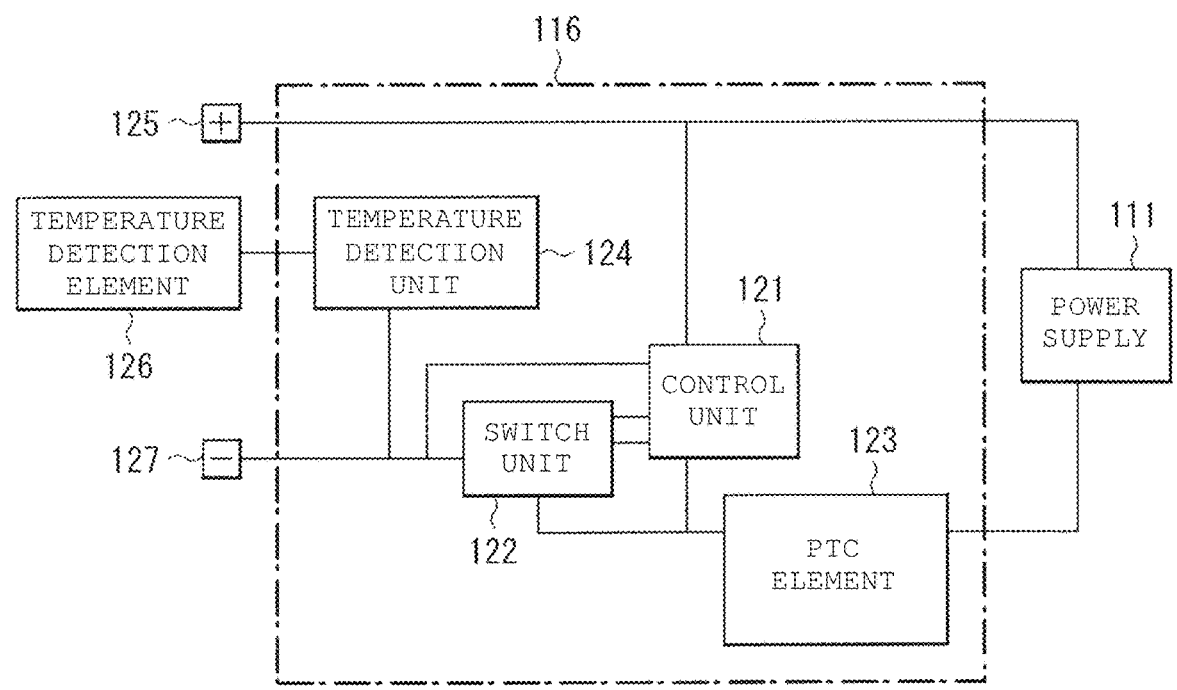
FIG. 9 is a block diagram illustrating the configuration of the battery pack shown in FIG. 8.

FIG. 8 shows a perspective configuration of a battery pack that uses a unit cell. FIG. 9 shows a block configuration of the battery pack shown in FIG. 8. It should be understood that FIG. 8 shows the battery pack disassembled.

The battery pack described herein is a simplified battery pack (so-called soft pack) that uses one secondary battery according to the present technology, which is, for example, mounted on electronic devices typified by smartphones. This battery pack includes, for example, as shown in FIG. 8, a power supply 111 which is a laminate film-type secondary battery, and a circuit board 116 connected to the power supply 111. A positive electrode lead 112 and a negative electrode lead 113 are attached to the power supply 111.

A pair of adhesive tapes 118, 119 is attached to both side surfaces of the power supply 111. The circuit board 116 has a protection circuit (PCM: Protection Circuit Module) formed. This circuit board 116 is connected to the positive electrode lead 112 via a tab 114, and connected to the negative electrode lead 113 via a tab 115. In addition, the circuit board 116 is connected to a connector lead wire 117 for external connection. It should be understood that with the circuit board 116 connected to the power supply 111, the circuit board 116 is protected by a label 120 and an insulating sheet 121. The circuit board 116, the insulating sheet 121, and the like are fixed with the label 120 attached.

In addition, the battery pack includes, for example, as shown in FIG. 9, the power supply 111 and the circuit board 116. The circuit board 116 includes, for example, a control unit 121, a switch unit 122, a PTC element 123, and a temperature detection unit 124. It is possible to connect the power supply 111 to the outside via a positive electrode terminal 125 and a negative electrode terminal 127, the power supply 111 is thus charged and discharged via the positive electrode terminal 125 and the negative electrode terminal 127. The temperature detection unit 124 detects the temperature with the use of a temperature detection terminal (so-called T terminal) 126.

The control unit 121 (controller) controls the operation (including the usage state of the power supply 111) of the whole battery pack. The control unit 121 includes, for example, a central processing unit (CPU) or a processor, a memory, and the like.

For example, when the battery voltage reaches the overcharge detection voltage, the control unit 121 disconnects the switch unit 122, thereby preventing any charging current from flowing through the current path of the power supply 111. Further, for example, when a large current flows during charging, the control unit 121 disconnects the switch unit 122, thereby shutting off the charging current.

On the other hand, for example, when the battery voltage reaches the overdischarge detection voltage, the control unit 121 disconnects the switch unit 122, thereby preventing any discharging current from flowing through the current path of the power supply 111. Further, for example, when a large current flows during discharging, the control unit 121 disconnects the switch unit 122, thereby shutting off the discharging current.

It should be understood that the overcharge detection voltage is, for example, 4.2 V±0.05 V, and the overdischarge detection voltage is, for example, 2.4 V±0.1 V.

In response to an instruction from the control unit 121, the switch unit 122 switches the usage state of the power supply 111, that is, whether there is a connection between the power supply 111 and an external device. This switch unit 122 includes, for example, a charge control switch and a discharge control switch, and the like. The charge control switch and the discharge control switch each serve as, for example, semiconductor switches such as a field effect transistor (MOSFET) using a metal oxide semiconductor. It should be understood that the charge/discharge current is detected, for example, on the basis of the ON resistance of the switch unit 122.

The temperature detection unit 124 measures the temperature of the power supply 111, and outputs the temperature measurement result to the control unit 121. This temperature detection unit 124 includes, for example, a temperature detecting element such as a thermistor. It should be understood that the measurement result of the temperature measured by the temperature detection unit 124 is used when the control unit 121 controls charge/discharge in the case of abnormal heat generation, when the control unit 121 executes correction processing in the case of remaining capacity calculation, and the like.

It should be understood that there is no need for the circuit board 116 to include the PTC element 123. In this case, the circuit board 116 may be separately provided with a PTC element.

Figure 10:
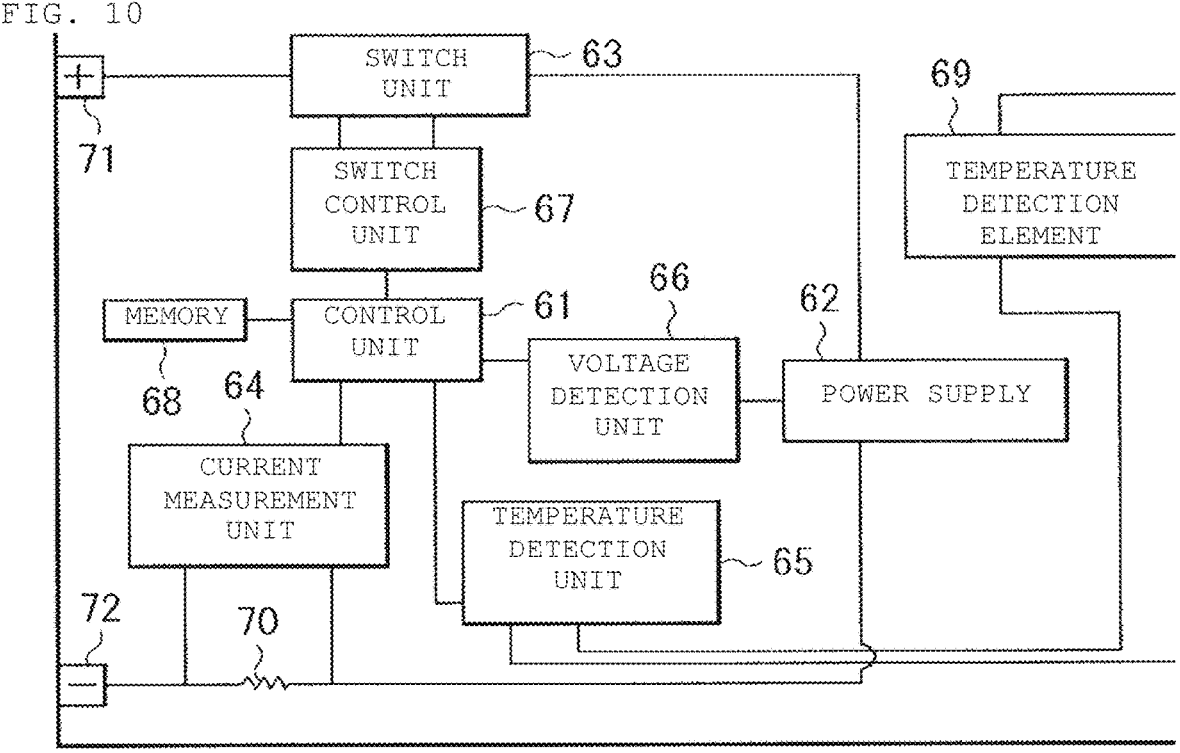
FIG. 10 is a block diagram illustrating the configuration of an application example (battery pack: assembled battery) of a secondary battery according to an embodiment of the present technology.

FIG. 10 shows a block configuration of a battery pack that uses an assembled battery according to an embodiment.

This battery pack includes, for example, inside a housing 60, a control unit 61 (controller), a power supply 62, a switch unit 63, a current measurement unit 64, a temperature detection unit 65, a voltage detection unit 66, a switch control unit 67, a memory 68, a temperature detection element 69, a current detection resistor 70, a positive electrode terminal 71, and a negative electrode terminal 72. The housing 60 includes, for example, a plastic material or the like.

The control unit 61 controls the operation (including the usage state of the power supply 62) of the whole battery pack. The control unit 61 includes, for example, a CPU or a processor and the like. The power supply 62 is an assembled battery including two or more secondary batteries according to the present technology, and the connection form of the two or more secondary batteries may be a connection in series, a connection in parallel, or a mixed type of the both. To give an example, the power supply 62 includes six secondary batteries connected in the form of two in parallel and three in series.

In response to an instruction from the control unit 61, the switch unit 63 switches the usage state of the power supply 62, that is, whether there is a connection between the power supply 62 and an external device. This switch unit 63 includes, for example, a charge control switch, a discharge control switch, a charging diode, a discharge diode, and the like. The charge control switch and the discharge control switch each serve as, for example, semiconductor switches such as a field effect transistor (MOSFET) using a metal oxide semiconductor.

The current measurement unit 64 measures current through the use of the current detection resistor 70, and outputs the current measurement result to the control unit 61. The temperature detection unit 65 measures a temperature through the use of the temperature detection element 69, and outputs the temperature measurement result to the control unit 61. The temperature measurement result is used, for example, when the control unit 61 controls charge/discharge in the case of abnormal heat generation, when the control unit 61 executes correction processing in the case of remaining capacity calculation, and the like. The voltage detection unit 66 measures the voltage of the secondary battery in the power supply 62, and supplies, to the control unit 61, the result of measuring the analog-digital converted voltage.

The switch control unit 67 controls the operation of the switch unit 63 in response to the signals input from each of the current measurement unit 64 and the voltage detection unit 66.

For example, when the battery voltage reaches the overcharge detection voltage, the switch control unit 67 disconnects the switch unit 63 (charge control switch), thereby preventing any charging current from flowing through the current path of the power supply 62. Thus, only discharge is allowed via the discharging diode in the power supply 62. Further, for example, when a large current flows during charging, the switch control unit 67 cuts off the charging current.

In addition, for example, when the battery voltage reaches the overdischarge detection voltage, the switch control unit 67 disconnects the switch unit 63 (discharge control switch), thereby preventing any discharging current from flowing through the current path of the power supply 62. Thus, only charge is allowed via the charging diode in the power supply 62. It should be understood that, for example, when a large current flows during discharging, the switch control unit 67 cuts off the discharging current.

It should be understood that the overcharge detection voltage is, for example, 4.2 V±0.05 V, and the overdischarge detection voltage is, for example, 2.4 V±0.1 V.

The memory 68 includes, for example, an EEPROM that is a non-volatile memory, or the like. This memory 68 stores, for example, numerical values calculated by the control unit 61, information on the secondary battery, measured at the stage of manufacturing process (for example, internal resistance in the initial state, etc.), and the like. Further, storing the full charge capacity of the secondary battery in the memory 68 makes it possible for the control unit 61 to grasp information such as the remaining capacity.

The temperature detection element 69 measures the temperature of the power supply 62, and outputs the temperature measurement result to the control unit 61. The temperature detection element 69 includes, for example, a thermistor or the like.

The positive electrode terminal 71 and the negative electrode terminal 72 are each a terminal connected to an external device (for example, a laptop personal computer, etc.) operated through the use of the battery pack, an external device (for example, a charger, etc.) used for charging the battery pack, or the like. The power supply 62 is charged and discharged via the positive electrode terminal 71 and the negative electrode terminal 72.

Figure 11:
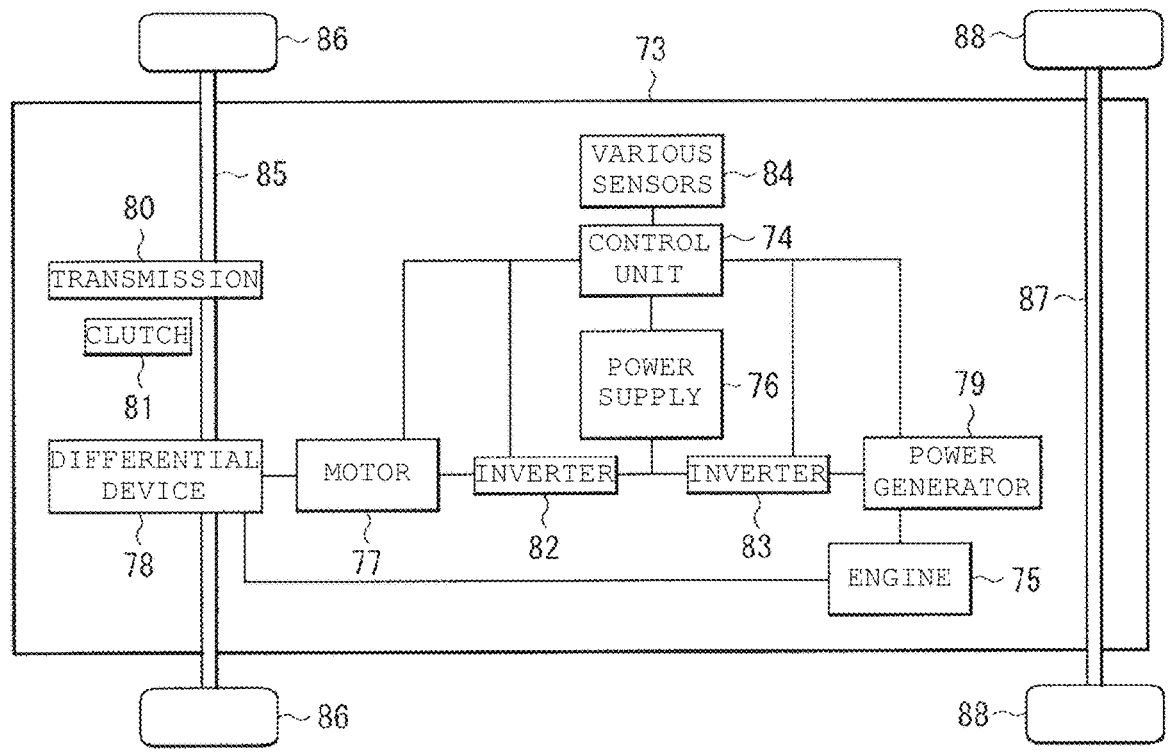
FIG. 11 is a block diagram illustrating the configuration of an application example (electric vehicle) of a secondary battery according to an embodiment of the present technology.

FIG. 11 shows a block configuration of a hybrid car as an example of an electric vehicle according to an embodiment.

The electric vehicle includes, for example, inside a metallic housing 73, a control unit 74 (controller), an engine 75, a power supply 76, a motor 77 for driving, a differential device 78, a power generator 79, a transmission 80 and a clutch 81, inverters 82, 83, and various sensors 84. Besides, the electric vehicle includes, for example, a front-wheel drive shaft 85 and front wheels 86 connected to the differential device 78 and the transmission 80, and a rear-wheel drive shaft 87 and rear wheels 88.

This electric vehicle can travel, for example, with any one of the engine 75 and the motor 77 as a driving source. The engine 75 is a main power source, for example, a gasoline engine or the like. When the engine 75 is adopted as a power supply, the driving force (torque) of the engine 75 is transmitted to the front wheels 86 or the rear wheels 88 via, for example, the differential device 78, the transmission 80, and the clutch 81 which are driving units (driver). Further, the torque of the engine 75 is transmitted to the power generator 79, the power generator 79 thus generates alternating-current power by the use of the torque, and the alternating-current power is converted to direct-current power via the inverter 83, and thus stored in the power supply 76. On the other hand, when the motor 77 as a conversion unit (converter) is adopted as a power supply, the power (direct-current power) supplied from the power supply 76 is converted to alternating-current power via the inverter 82, and the motor 77 is thus driven by the use of the alternating-current power. The driving force (torque) converted from the power by the motor 77 is transmitted to the front wheels 86 and the rear wheels 88 via, for example, the differential device 78, the transmission 80, and the clutch 81 which are driving units.

It should be understood the electric vehicle may be configured such that when the electric vehicle is decelerated via a braking mechanism, the resistance force at the time of deceleration is transmitted as a torque to the motor 77, and the motor 77 thus generates alternating-current power by the use of the torque. This alternating-current power is converted to direct-current power via the inverter 82, and the direct-current regenerative power is thus preferably stored in the power supply 76.

The control unit 74 controls the operation of the whole electric vehicle. The control unit 74 includes, for example, a CPU or a processor and the like. The power supply 76 includes one or more secondary batteries according to the present technology. The power supply 76 may be connected to an external power supply, and supplied with electric power from the external power supply to store the electric power. The various sensors 84 are used, for example, for controlling the rotation speed of the engine 75, and controlling the opening (throttle opening) of a throttle valve. The various sensors 84 include, for example, any one of, or two or more of a speed sensor, an acceleration sensor, an engine speed sensor, and the like.

It should be understood that although a case where the electric vehicle is a hybrid car has been given as an example, the electric vehicle may be a vehicle (electric car) that operates through the use of only the power supply 76 and the motor 77 without using the engine 75.

Figure 12:
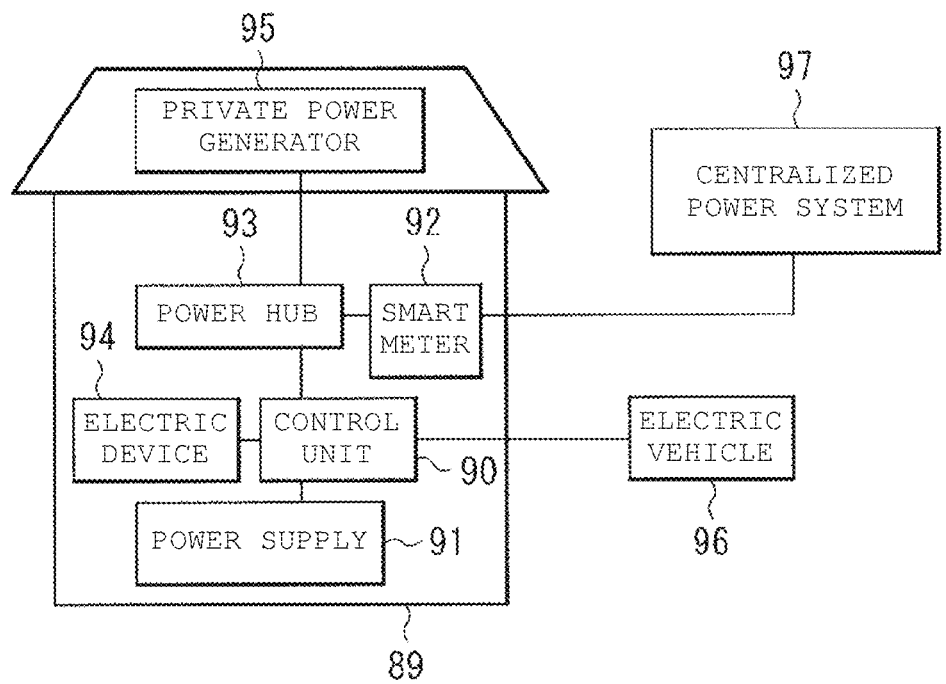
FIG. 12 is a block diagram illustrating the configuration of an application example (power storage system) of a secondary battery according to an embodiment of the present technology.

FIG. 12 shows a block configuration of a power storage system.

This power storage system includes, for example, a control unit 90 (controller), a power supply 91, a smart meter 92, and a power hub 93 inside a house 89 such as a general house and a commercial building.

In this regard, the power supply 91 is connected to, for example, an electric device 94 installed inside the house 89, and connectable to an electric vehicle 96 parked outside the house 89. Further, the power supply 91 is, for example, connected via the power hub 93 to a private power generator 95 installed in the house 89, and connectable to an external centralized power system 97 via the smart meter 92 and the power hub 93.

It should be understood that the electric device 94 includes, for example, one or more home electric appliances, and the home electric appliances may be, for example, a refrigerator, an air conditioner, a television, and a water heater. The private power generator 95 includes, for example, any one of, or two or more of a solar power generator, a wind power generator, and the like. The electric vehicle 96 includes, for example, any one of, or two or more of electric cars, electric bikes, hybrid cars, and the like. The centralized power system 97 includes, for example, any one of, or two or more of a thermal power plant, a nuclear power plant, a hydraulic power plant, a wind power plant, and the like.

The control unit 90 controls the operation (including the usage state of the power supply 91) of the whole power storage system. The control unit 90 includes, for example, a CPU or a processor and the like. The power supply 91 includes one or more secondary batteries according to the present technology. The smart meter 92 is, for example, a network-compatible power meter installed in the house 89 on the power demand side, which is capable of communicating with the power supply side. Accordingly, the smart meter 92 controls the balance between demand and supply of electric power in the house 89 while communicating with the outside, thereby allowing highly efficient and stable supply of energy.

In this power storage system, for example, power is stored in the power supply 91 via the smart meter 92 and the power hub 93 from the centralized power system 97, which is an external power supply, and power is stored in the power supply 91 via the power hub 93 from the private power generator 95, which is an independent power supply. The electric power stored in the power supply 91 is supplied to the electric device 94 and the electric vehicle 96 in response to an instruction from the control unit 90, thus allowing the operation of the electric device 94, and allowing the electric vehicle 96 to be charged. More specifically, the power storage system is a system that allows power to be stored and supplied in the house 89 with the use of the power supply 91.

It is possible to use the electric power stored in the power supply 91 as required. For this reason, for example, electric power can be stored in the power supply 91 from the centralized power system 97 at midnight when the electricity charge is inexpensive, and the electric power stored in the power supply 91 can be used during the day when the electricity charge is expensive.

It should be understood that the power storage system mentioned above may be installed for every single house (one household), or may be installed for every multiple houses (multiple households).

Figure 13:
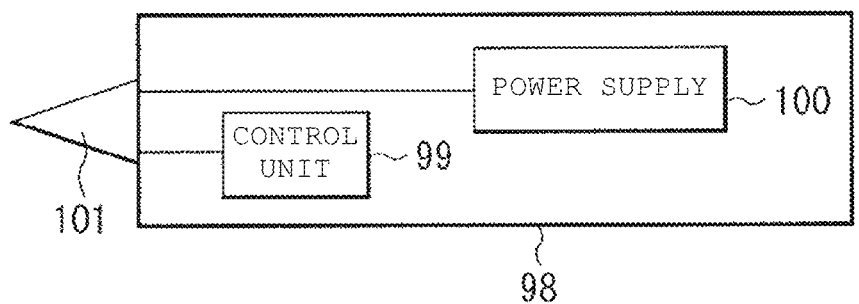
FIG. 13 is a block diagram illustrating the configuration of an application example (power tool) of a secondary battery according to an embodiment of the present technology.

FIG. 13 shows a block configuration of a power tool.

The power tool described herein is, for example, an electric drill. The power tool includes, for example, a control unit 99 and a power supply 100 inside a tool body 98. For example, a drill part 101 as a movable part is operatably (rotatably) attached to the tool body 98.

The tool body 98 includes, for example, a plastic material or the like. The control unit 99 (controller) controls the operation (including the usage state of the power supply 100) of the whole power tool. The control unit 99 includes, for example, a CPU or a processor and the like. The power supply 100 includes one or more secondary batteries according to the present technology. The control unit 99 supplies electric power from the power supply 100 to the drill part 101 in response to an operation of an operation switch.

EXAMPLES

Examples of the present technology will be described.

Experimental Examples 1 to 20

Laminated film type lithium ion secondary batteries shown in FIGS. 6 and 7 were produced in accordance with the following procedure.

In preparing the positive electrode 33, first, 98 parts by mass of a positive electrode active material ($LiCoO_2$), 1 part by mass of a positive electrode binder (polyvinylidene fluoride), and 1 part by mass of a positive electrode conductive material (carbon black) were mixed to provide a positive electrode combination. Subsequently, the positive electrode combination was put in an organic solvent (N-methyl-2-pyrrolidone), the organic solvent was then stirred, thereby providing a paste-like positive electrode combination slurry. Subsequently, the positive electrode combination slurry was applied to both sides of the positive electrode current collector 33A (15 μm thick aluminum foil) with the use of a coating device, and the positive electrode combination slurry was then dried to form the positive electrode active material layer 33B. Finally, the positive electrode active material layer 33B was subjected to compression molding with the use of a roll press machine. In this case, the volume density of the positive electrode active material layer 33B was adjusted to be 3.7 g/cm$^3$.

In the case of preparing the negative electrode 34, first, 100−X−Y parts by mass of a plurality of particulate negative electrode active materials (graphite as a carbon material), X parts by mass of a first negative electrode binder (styrene butadiene rubber: SBR), Y part by mass of a plurality of particulate second negative electrode binders (polyvinylidene fluoride: PVDF), and 1 part by mass of a thickener (carboxymethyl cellulose) were mixed to provide a negative electrode combination. In this case, for comparison, the first negative electrode binder and the second negative electrode binder were both used, and only either one of the first negative electrode binder and the second negative electrode binder was used.

The presence or absence of each of the first negative electrode binder and the second negative electrode binder, the respective mixture proportions (contents: weight %) of the negative electrode active materials, the first negative electrode binder, and the second negative electrode binders, the average particle size (median diameter D50: μm) and specific surface area (m$^2$/g) of the negative electrode active materials, and the average particle size (median diameter D50: μm) of the second negative electrode binders are as shown in Tables 1 and 2.

Subsequently, the negative electrode combination was put in an aqueous solvent (pure water), the aqueous solvent was then stirred, thereby providing a paste-like negative electrode combination slurry. Thus, in the aqueous solvent, the negative electrode active material, the first negative electrode binder, and the second negative electrode binder were each dispersed. Subsequently, the negative electrode combination slurry was applied to both sides of the negative electrode current collector 34A (15 μm thick copper foil) with the use of a coating device, and the negative electrode combination slurry was then dried to form the negative electrode active material layer 34B including the negative electrode active material, the first negative electrode binder, and the second negative electrode binder. Finally, the negative electrode active material layer 34B was subjected to compression molding with the use of a roll press machine. In this case, the volume density of the negative electrode active material layer 34B was adjusted to be 1.7 g/cm$^3$. The thickness (μm) of the negative electrode active material layer 34B after the compression molding is as shown in Tables 1 and 2.

In the case of forming the electrolyte layer 36, an electrolytic solution was first prepared by dissolving an electrolyte salt (LiPF$_6$) in a solvent (ethylene carbonate (EC) and propylene carbonate (PC)). In this case, the composition of the solvent was adjusted to ethylene carbonate:propylene carbonate=50:50 in ratio by weight, and the content of the electrolyte salt was adjusted to 1 mol/kg with respect to the solvent.

Subsequently, a precursor solution was prepared by mixing the electrolytic solution, a polymer compound (polyvinylidene fluoride), and an organic solvent (diethyl carbonate) for dilution. In this case, the mixture ratio between the electrolytic solution and the polymer compound was adjusted to electrolytic solution:polymer compound=15:1 in ratio by weight.

Finally, after applying the precursor solution to the surface of the positive electrode 33, the precursor solution was dried to form the gel-like electrolyte layer 36. In addition, after applying the precursor solution to the surface of the negative electrode 34, the precursor solution was dried to form the gel-like electrolyte layer 36.

In the case of assembling a secondary battery, first, the positive electrode lead 31 was welded to the positive electrode current collector 33A, and the negative electrode lead 32 was welded to the negative electrode current collector 34A. Subsequently, the positive electrode 33 with the electrolyte layer 36 formed and the negative electrode 34 with the electrolyte layer 36 formed were stacked with the separator 35 (microporous polyethylene film of 25 μm in thickness) interposed therebetween, and the stacked object was wound, thereby providing a wound body. Subsequently, after winding the wound body in the longitudinal direction, the protective tape 37 was attached to the outermost circumferential part of the wound body, thereby forming the wound electrode body 30. Finally, the exterior member 40 was folded so as to sandwich the wound electrode body 30, and outer peripheral edges of the exterior member 40 were then subjected to thermally fusion bonding. Thus, the wound electrode body 30 was enclosed inside the exterior member 40. In this case, the adhesive film 41 was inserted between the positive electrode lead 31 and the exterior member 40, and the adhesive film 41 was inserted between the negative electrode lead 32 and the exterior member 40.

Thus, a laminate film-type lithium ion secondary battery was completed.

As battery characteristic of the secondary battery, ordinary-temperature cycle characteristics, ordinary-temperature swelling characteristics and high-temperature swelling characteristics were examined, thereby providing the results shown in Table 1 and Table 2.

In the case of examining the ordinary-temperature cycle characteristics, first, the secondary battery was charged and discharged for one cycle in an ordinary-temperature environment (23° C.) in order to stabilize the battery state. Subsequently, the secondary battery was charged and discharged again for one cycle in the same environment, thereby measuring the 2nd-cycle discharged capacity. Subsequently, the secondary battery was repeatedly charged and discharged until the total number of cycles reached 100 cycles in the same environment, thereby measuring the 100th-cycle discharged capacity. Finally, the ordinary-temperature retention rate (%)=(100th-cycle discharged capacity/2nd-cycle discharge capacity)×100 was calculated.

Here are the 1st-cycle charge/discharge conditions. In the case of charging, the battery was charged with a current of 0.2C until the voltage reached 4.3 V, and then further charged at a voltage of 4.3 V until the current reached 0.05C. In the case of discharging, the battery was discharged with a current of 0.2C until the voltage reached 2.5 V. The term "0.2C" refers to a current value for fully discharging the battery capacity (theoretical capacity) in 5 hours, and the term "0.05C" refers to a current value for fully discharging the battery capacity in 20 hours.

Here are the 2nd-cycle and subsequent-cycle charge/discharge conditions. In the case of charging, the battery was charged with a current of 1 C until the voltage reached 4.3 V, and then further charged at a voltage of 4.3 V until the current reached 0.05C. In the case of discharging, the battery was discharged with a current of 1 C until the voltage reached 2.5 V. The term "1 C" refers to a current value for fully discharging the battery capacity (theoretical capacity) in 1 hour.

In the case of examining the ordinary-temperature swelling characteristics, the thickness of the secondary battery was measured in the measurement of the 2nd-cycle discharged capacity in accordance with the procedure for examining the ordinary-temperature cycle characteristics. Subsequently, the thickness of the secondary battery was measured in the measurement of the 100th-cycle discharged capacity. Finally, the ordinary-temperature swelling rate (%)=[(100th-cycle thickness−2nd-cycle thickness)/2nd-cycle thickness]×100 was calculated.

In the case of examining the high-temperature swelling characteristics, with the use of the secondary battery in the battery state stabilized by the procedure mentioned above, the secondary battery was charged in an ordinary-temperature environment (23° C.), and the thickness of the secondary battery was then measured. Subsequently, after storing the charged secondary battery in a high-temperature environment (60° C.) (storage period=1 month), the thickness of the secondary battery was measured. Finally, the high-temperature swelling rate (%)=[(thickness after storage−thickness before storage)/thickness before storage]×100 was calculated. It should be understood that the same charging conditions were made as in the case of examining the ordinary-temperature cycle characteristics (the 2nd-cycle and subsequent-cycle charging conditions).

Specifically, when the negative electrode active material layer 34B includes only one of the first negative electrode binder (styrene butadiene rubber) and the second negative electrode binder (polyvinylidene fluoride) (Experimental Examples 14 to 19), no balance has been achieved between the ordinary-temperature swelling rate and high-temperature swelling rate each suppressed sufficiently and the ordinary-temperature retention rate increased sufficiently.

In addition, when the average particle size (D50) of the second negative electrode binder fails to fall within an appropriate range (Experimental Example 20) even when the negative electrode active material layer 34B includes both of the first negative electrode binder and the second negative electrode binder, no balance has been achieved between the ordinary-temperature swelling rate and high-temperature swelling rate each suppressed sufficiently and the ordinary-temperature retention rate increased sufficiently.

In contrast, when the negative electrode active material layer 34B includes both of the first negative electrode binder and the second negative electrode binder, when the average

TABLE 1

Solvent: EC + PC (the mixture ratio (ratio by weight) is EC:PC = 50:50)

| Experimental Example | Negative Electrode Active Material | | | First Negative Electrode Binder | | Second Negative Electrode Binder | | | Thickness ($\mu m$) | Ordinary Temperature Retention Rate (%) | Ordinary Temperature Swelling Rate (%) | High Temperature Swelling Rate (%) |
|---|---|---|---|---|---|---|---|---|---|---|---|---|
| | Type | D50 ($\mu m$) | Specific Surface Area ($m^2/g$) | Content (wt %) | Type | Content (wt %) | Type | D50 ($\mu m$) | Content (wt %) | | | | |
| 1 | Graphite | 15 | 4 | 98.5 | SBR | 0.5 | PVDF | 1 | 1 | 110 | 94 | 3.8 | 7 |
| 2 | Graphite | 15 | 4 | 98 | SBR | 1 | PVDF | 1 | 1 | 110 | 94.1 | 3.3 | 6 |
| 3 | Graphite | 15 | 4 | 97 | SBR | 2 | PVDF | 1 | 1 | 110 | 92.8 | 3.7 | 6 |
| 4 | Graphite | 15 | 4 | 94 | SBR | 5 | PVDF | 1 | 1 | 110 | 92.1 | 4.3 | 5 |
| 5 | Graphite | 15 | 4 | 98.5 | SBR | 1 | PVDF | 1 | 0.5 | 110 | 94 | 3.8 | 12 |
| 6 | Graphite | 15 | 4 | 97 | SBR | 1 | PVDF | 1 | 2 | 110 | 94.1 | 3.2 | 5 |
| 7 | Graphite | 15 | 4 | 94 | SLR | 1 | PVDF | 1 | 5 | 110 | 92 | 4.2 | 5 |
| 8 | Graphite | 5 | 15 | 98 | SBR | 1 | PVDF | 1 | 1 | 110 | 96.2 | 2.9 | 7 |
| 9 | Graphite | 30 | 0.8 | 98 | SBR | 1 | PVDF | 1 | 1 | 110 | 92.5 | 3.8 | 4 |
| 10 | Graphite | 15 | 4 | 98 | SBR | 1 | PVDF | 0.1 | 1 | 110 | 94.3 | 3.3 | 6 |
| 11 | Graphite | 15 | 4 | 98 | SBR | 1 | PVDF | 10 | 1 | 110 | 93.8 | 3.5 | 7 |
| 12 | Graphite | 15 | 4 | 98 | SBR | 1 | PVDF | 1 | 1 | 30 | 96.9 | 2.9 | 5 |
| 13 | Graphite | 15 | 4 | 98 | SBR | 1 | PVDF | 1 | 1 | 250 | 85.1 | 5.8 | 10 |

TABLE 2

Solvent: EC + PC (the mixture ratio (ratio by weight) is EC:PC = 50:50)

| Experimental Example | Negative Electrode Active Material | | | First Negative Electrode Binder | | Second Negative Electrode Binder | | | Thickness ($\mu m$) | Ordinary Temperature Retention Rate (%) | Ordinary Temperature Swelling Rate (%) | High Temperature Swelling Rate (%) |
|---|---|---|---|---|---|---|---|---|---|---|---|---|
| | Type | D50 ($\mu m$) | Specific Surface Area ($m^2/g$) | Content (wt %) | Type | Content (wt %) | Type | D50 ($\mu m$) | Content (wt %) | | | | |
| 14 | Graphite | 15 | 4 | 98 | SBR | 2 | — | — | — | 110 | 89.5 | 5.5 | 21 |
| 15 | Graphite | 15 | 4 | 98 | — | — | PVDF | 1 | 2 | 110 | 90.9 | 4.4 | 13 |
| 16 | Graphite | 5 | 15 | 98 | SBR | 2 | — | — | — | 110 | 85.5 | 6.8 | 30 |
| 17 | Graphite | 30 | 0.8 | 98 | SBR | 2 | — | — | — | 110 | 91.1 | 4.8 | 18 |
| 18 | Graphite | 15 | 4 | 98 | SBR | 2 | — | — | — | 30 | 92.8 | 3.9 | 19 |
| 19 | Graphite | 15 | 4 | 98 | SBR | 2 | — | — | — | 250 | 81.3 | 8.1 | 24 |
| 20 | Graphite | 15 | 4 | 98 | SBR | 1 | PVDF | 15 | 1 | 110 | 87.6 | 5.8 | 13 |

As is clear from Tables 1 and 2, the ordinary-temperature retention rate, the ordinary-temperature swelling rate, and the high-temperature swelling rate varied greatly depending on the configuration of the negative electrode 34 (negative electrode active material layer 34B).

particle size (D50) of the negative electrode active material falls within an appropriate range (=5 μm to 30 μm), and when the average particle size (D50) of the second negative electrode binder falls within an appropriate range (=0.1 μm to 10 μm) (Experimental Examples 1 to 13), a balance has been achieved between the ordinary-temperature swelling rate and high-temperature swelling rate each suppressed sufficiently and the ordinary-temperature retention rate increased sufficiently. More specifically, the ordinary-temperature retention rate was increased sufficiently, while both the ordinary-temperature swelling rate and the high-temperature swelling rate were suppressed sufficiently.

In this case (Experimental Examples 1 to 13), when the mixture proportions (wt %) of the negative electrode active material, the first negative electrode binder, and the second negative electrode binder satisfied the conditions of: X=0.5 wt % to 5 wt % and Y=0.5 wt % to 5 wt % (wt %), the ordinary-temperature swelling rate and the high-temperature swelling rate were both suppressed sufficiently, and the ordinary-temperature retention rate was increased sufficiently.

In addition, when the thickness of the negative electrode active material layer 34B including the first negative electrode binder and the second negative electrode binders along with the negative electrode active materials is 30 μm to 250 μm, the ordinary-temperature swelling rate and the high-temperature swelling rate were both suppressed sufficiently, and the ordinary-temperature retention rate was increased sufficiently.

Experimental Examples 21 to 32

Secondary batteries were prepared by the same procedure as in Experimental Examples 1 to 20, except that the type of the negative electrode active material was changed, and the battery characteristics were examined, thereby providing the results shown in Table 3.

As the negative electrode active material, a silicon-based material was used instead of the carbon material, and a mixture of the carbon material and the silicon-based material was used. As this silicon-based material, a simple substance of silicon (Si), a silicon oxide (SiO) as an oxide of silicon, and a silicon-titanium alloy ($SiTi_{0.1}$) as an alloy of silicon were used. Regarding the mixture, the mixture ratio (ratio by weight) between the carbon material and the silicon-based material was adjusted to carbon material: silicon-based material=90:10.

The type of the negative electrode active material, the presence or absence of the second negative electrode binder, the respective mixture proportions (contents:weight %) of the negative electrode active materials, the first negative electrode binder, and the second negative electrode binders, the average particle size (median diameter D50: μm) and specific surface area ($m^2$/g) of the negative electrode active materials, the average particle size (median diameter D50: μm) of the second negative electrode binders, and the thickness (μm) of the negative electrode active material layer 34B after the compression molding are as shown in Table 3. It should be understood that when the mixture was used as the negative electrode active material, the average particle size (D50) of the whole mixture was 14 μm, and the specific surface area of the whole mixture was 3.8 $m^2$/g.

TABLE 3

Solvent: EC + PC (the mixture ratio (ratio by weight) is EC:PC = 50:50)

| Experimental Example | Negative Electrode Active Material | | | First Negative Electrode Binder | | Second Negative Electrode Binder | | | Thickness (μm) | Ordinary Temperature Retention Rate (%) | Ordinary Temperature Swelling Rate (%) | High Temperature Swelling Rate (%) |
|---|---|---|---|---|---|---|---|---|---|---|---|---|
| | Type | D50 (μm) | Specific Surface Area ($m^2$/g) | Content (wt %) | Type | Content (wt %) | Type | D50 (μm) | Content (wt %) | | | | |
| 21 | Si | 5 | 2.1 | 98 | SBR | 1 | PVDF | 1 | 1 | 50 | 65.5 | 10.2 | 15 |
| 22 | SiO | 5 | 2.3 | 98 | SBR | 1 | PVDF | 1 | 1 | 50 | 80.6 | 6.5 | 14 |
| 23 | $SiTi_{0.1}$ | 5 | 2.3 | 98 | SBR | 1 | PVDF | 1 | 1 | 50 | 78.8 | 7.4 | 14 |
| 24 | Graphite + Si | 15 + 5 | 4 + 2.1 | 98 | SBR | 1 | PVDF | 1 | 1 | 50 | 78 | 7.7 | 8 |
| 25 | Graphite + SiO | 15 + 5 | 4 + 2.3 | 98 | SBR | 1 | PVDF | 1 | 1 | 50 | 91.5 | 5.1 | 7 |
| 26 | Graphite + $SiTi_{0.1}$ | 15 + 5 | 4 + 2.3 | 98 | SBR | 1 | PVDF | 1 | 1 | 50 | 89.8 | 5.5 | 7 |
| 27 | Si | 5 | 2.1 | 98 | SBR | 2 | — | — | — | 50 | 59.7 | 14.5 | 35 |
| 28 | SiO | 5 | 2.3 | 98 | SBR | 2 | — | — | — | 50 | 71.1 | 10.5 | 30 |
| 29 | $SiTi_{0.1}$ | 5 | 2.3 | 98 | SBR | 2 | — | — | — | 50 | 68.8 | 12 | 32 |
| 30 | Graphite + Si | 15 + 5 | 4 + 2.1 | 98 | SBR | 2 | — | — | — | 50 | 70.1 | 9.9 | 15 |
| 31 | Graphite + SiO | 15 + 5 | 4 + 2.3 | 98 | SBR | 2 | — | — | — | 50 | 82.2 | 8.8 | 14 |
| 32 | Graphite + $SiTi_{0.1}$ | 15 + 5 | 4 + 2.3 | 98 | SBR | 2 | — | — | — | 50 | 82.5 | 8.8 | 13 |

Similar results to those in the case of using the carbon material (Table 1 and Table 2) were also obtained in the case of using the silicon-based material and using the mixture of the carbon material and the silicon-based material as the negative electrode active material (Table 3).

More specifically, when the negative electrode active material layer 34B includes only the first negative electrode binder (styrene butadiene rubber) (Experimental Examples 27 to 32), no balance has been achieved between the ordinary-temperature swelling rate and high-temperature swelling rate each suppressed sufficiently and the ordinary-temperature retention rate increased sufficiently.

In contrast, when the negative electrode active material layer 34B includes both of the first negative electrode binder and the second negative electrode binder, when the average particle size (D50) of the negative electrode active material falls within an appropriate range (=5 μm to 30 μm), and when the average particle size (D50) of the second negative electrode binder falls within an appropriate range (=0.1 μm to 10 μm) (Experimental Examples 21 to 26), a balance has been achieved between the ordinary-temperature swelling rate and high-temperature swelling rate each suppressed sufficiently and the ordinary-temperature retention rate increased sufficiently.

It should be understood while the silicon oxide (SiO) was used as an oxide of silicon, similar tendencies should be also obtained in the case of when other silicon oxides ($SiO_v$: $0<v<2$) are used (excluding SiO), and when other oxides of silicon are used. In addition, while the silicon-titanium alloy ($SiTi_{0.1}$) was used as an alloy of silicon, similar tendencies should be also obtained in the case of using other silicon alloys.

Experimental Examples 33 to 76

Secondary batteries were prepared by the same procedure as in Experimental Examples 1 to 20, if necessary, except that the evaluation content for battery characteristics was changed, and that the composition of the electrolytic solution was changed, and the battery characteristics were examined, thereby providing the results shown in Tables 4 to 11.

As a solvent, diethyl carbonate (DEC), ethyl methyl carbonate (EMC), and dimethyl carbonate (DMC) were used together with ethylene carbonate and propylene carbonate. Succinonitrile (SN) as a dinitrile compound and 4-fluoro-1,3-dioxolan-2-one (FEC) as a halogenated cyclic carbonate were used as an additive. The mixture ratio (ratio by weight) of the solvent and the content (wt %) of the additive in the electrolytic solution are as shown in Tables 4 to 11.

Ordinary-temperature charge/discharge characteristics, swelling characteristics after low-temperature discharge, and high-temperature swelling characteristics were examined as battery characteristics.

In the case of examining the ordinary-temperature charge/discharge characteristics, the secondary battery was charged and discharged for one cycle in an ordinary-temperature environment (23° C.) in order to stabilize the battery state, thereby measuring the 1st-cycle charged capacity and the 1st-cycle discharged capacity. After this, the ordinary-temperature charge/discharge efficiency (%)=(1st-cycle discharged capacity/1st-cycle charged capacity)×100 was calculated.

In the case of charging, the battery was charged with a current of 0.1C until the voltage reached 4.3 V, and then further charged at a voltage of 4.3 V until the current reached 0.05C. In the case of discharging, the battery was discharged with a current of 0.1C until the voltage reached 2.5 V. The term "0.1C" refers to a current value for fully discharging the battery capacity (theoretical capacity) in 10 hours.

In the case of examining the swelling characteristics after low-temperature discharge, first, with the use of the secondary battery in the battery state stabilized by the procedure mentioned above, the secondary battery was charged in an ordinary-temperature environment (23° C.). Subsequently, after the secondary battery was discharged in a low-temperature environment (0° C.), the thickness of the secondary battery in the discharged state (the thickness before storage) was measured in an ordinary-temperature environment (23° C.). Subsequently, the secondary battery in the discharged state was stored (storage period=2 weeks) in an ordinary-temperature environment (23° C.), and the thickness (post-storage thickness) of the secondary battery was then measured in the same environment. Finally, the swelling rate after low-temperature discharge (%)=[(thickness after storage−thickness before storage)/thickness before storage]×100 was calculated.

The same charging conditions in the ordinary-temperature environment were made as in the case of examining the ordinary-temperature charge/discharge characteristics. In the case of discharging in the low-temperature environment, the battery was discharged with a current of 0.05C until the voltage reached 2.0 V.

The procedure in the case of examining the high-temperature swelling characteristic is as described herein.

TABLE 4

| Experimental Example | Negative Electrode Active Material | | | | First Negative Electrode Binder | | Second Negative Electrode Binder | | | Thickness (μm) |
|---|---|---|---|---|---|---|---|---|---|---|
| | Type | D50 (μm) | Specific Surface Area (m²/g) | Content (wt %) | Type | Content (wt %) | Type | D50 (μm) | Content (wt %) | |
| 33 | Graphite | 15 | 4 | 98 | SBR | 1 | PVDF | 1 | 1 | 110 |
| 34 | Graphite | 15 | 4 | 98 | SBR | 1 | PVDF | 1 | 1 | 110 |
| 35 | Graphite | 15 | 4 | 98 | SBR | 1 | PVDF | 1 | 1 | 110 |
| 36 | Graphite | 15 | 4 | 98 | SBR | 1 | PVDF | 1 | 1 | 110 |
| 37 | Graphite | 15 | 4 | 98 | SBR | 1 | PVDF | 1 | 1 | 110 |
| 38 | Graphite | 15 | 4 | 98 | SBR | 1 | PVDF | 1 | 1 | 110 |
| 39 | Graphite | 15 | 4 | 98 | SBR | 1 | PVDF | 1 | 1 | 110 |
| 40 | Graphite | 15 | 4 | 98 | SBR | 1 | PVDF | 1 | 1 | 110 |
| 41 | Graphite | 15 | 4 | 98 | SBR | 1 | PVDF | 1 | 1 | 110 |

TABLE 4-continued

| Experimental Example | Negative Electrode Active Material | | | | First Negative Electrode Binder | | Second Negative Electrode Binder | | | Thickness (μm) |
|---|---|---|---|---|---|---|---|---|---|---|
| | Type | D50 (μm) | Specific Surface Area (m²/g) | Content (wt %) | Type | Content (wt %) | Type | D50 (μm) | Content (wt %) | |
| 42 | Graphite | 15 | 4 | 98 | SBR | 1 | PVDF | 1 | 1 | 110 |
| 43 | Graphite | 15 | 4 | 98 | SBR | 1 | PVDF | 1 | 1 | 110 |
| 44 | Graphite | 15 | 4 | 98 | SBR | 1 | PVDF | 0.1 | 1 | 110 |
| 45 | Graphite | 15 | 4 | 98 | SBR | 1 | PVDF | 10 | 1 | 110 |

TABLE 5

| Experimental Example | Electrolytic Solution | | Additive | | Ordinary Temperature Charge/Discharge Efficiency (%) | Swelling Rate after Low-Temperature Discharge (%) | High Temperature Swelling Rate (%) |
|---|---|---|---|---|---|---|---|
| | Solvent Type | Mixture Ratio (Ratio by Weight) | Type | Content (wt %) | | | |
| 33 | DEC + PC | 50:50 | — | — | 85.5 | 2.7 | 6 |
| 34 | DEC + PC | 99:1 | — | — | 86.1 | 2.6 | 6.2 |
| 35 | DEC + PC | 95:5 | — | — | 83 | 2.2 | 6.1 |
| 36 | DEC + PC | 90:10 | — | — | 83.1 | 2.1 | 6 |
| 37 | DEC + PC | 70:30 | — | — | 89.5 | 2.3 | 6.5 |
| 38 | EC + PC | 50:50 | — | — | 89.2 | 2.9 | 5 |
| 39 | EMC + PC | 50:50 | — | — | 86.3 | 2 | 6.5 |
| 40 | DMC + PC | 50:50 | — | — | 90.7 | 2.9 | 6.3 |
| 41 | EC + DEC + PC | 100/3:100/3:100/3 | — | — | 83.4 | 2.5 | 7 |
| 42 | EC + EMC + PC | 100/3:100/3:100/3 | — | — | 88.6 | 2.2 | 6.8 |
| 43 | EC + DMC + PC | 100/3:100/3:100/3 | — | — | 85.1 | 2.6 | 7 |
| 44 | DEC + PC | 50:50 | — | — | 84 | 2 | 6.6 |
| 45 | DEC + PC | 50:50 | — | — | 92.7 | 2.2 | 6.9 |

TABLE 6

| Experimental Example | Negative Electrode Active Material | | | | First Negative Electrode Binder | | Second Negative Electrode Binder | | | Thickness (μm) |
|---|---|---|---|---|---|---|---|---|---|---|
| | Type | D50 (μm) | Specific Surface Area (m²/g) | Content (wt %) | Type | Content (wt %) | Type | D50 (μm) | Content (wt %) | |
| 46 | Graphite | 5 | 15 | 98 | SBR | 1 | PVDF | 1 | 1 | 110 |
| 47 | Graphite | 30 | 0.8 | 98 | SBR | 1 | PVDF | 1 | 1 | 110 |
| 48 | Graphite | 15 | 4 | 98 | SBR | 1 | PVDF | 1 | 1 | 30 |
| 49 | Graphite | 15 | 4 | 98 | SBR | 1 | PVDF | 1 | 1 | 250 |
| 50 | Graphite | 15 | 4 | 98 | SBR | 1 | PVDF | 1 | 1 | 110 |
| 51 | Graphite | 15 | 4 | 98 | SBR | 1 | PVDF | 1 | 1 | 110 |
| 52 | Graphite | 15 | 4 | 98 | SBR | 1 | PVDF | 1 | 1 | 110 |
| 53 | Graphite | 15 | 4 | 98 | SBR | 1 | PVDF | 1 | 1 | 110 |
| 54 | Graphite | 15 | 4 | 98 | SBR | 1 | PVDF | 1 | 1 | 110 |
| 55 | Graphite | 15 | 4 | 98 | SBR | 1 | PVDF | 1 | 1 | 110 |
| 56 | Graphite | 15 | 4 | 98 | SBR | 1 | PVDF | 1 | 1 | 110 |

TABLE 7

| Experimental Example | Electrolytic Solution Solvent Type | Mixture Ratio (Ratio by Weight) | Additive Type | Additive Content (wt %) | Ordinary Temperature Charge/Discharge Efficiency (%) | Swelling Rate after Low-Temperature Discharge (%) | High Temperature Swelling Rate (%) |
|---|---|---|---|---|---|---|---|
| 46 | DEC + PC | 50:50 | — | — | 90.9 | 2.9 | 7 |
| 47 | DEC + PC | 50:50 | — | — | 88.5 | 2.7 | 6 |
| 48 | DEC + PC | 50:50 | — | — | 90.9 | 2.8 | 6.9 |
| 49 | DEC + PC | 50:50 | — | — | 84.5 | 2.3 | 6.5 |
| 50 | DEC + PC | 50:50 | SN | 0.1 | 88.2 | 2.7 | 5.3 |
| 51 | DEC + PC | 50:50 | SN | 1 | 85.1 | 2.2 | 4.3 |
| 52 | DEC + PC | 50:50 | SN | 5 | 81.3 | 2.1 | 3.2 |
| 53 | DEC + PC | 50:50 | FEC | 1 | 83 | 2.9 | 6.7 |
| 54 | DEC + PC | 50:50 | FEC | 5 | 90.2 | 2.9 | 6.9 |
| 55 | DEC + PC | 50:50 | FEC | 10 | 92.1 | 2.2 | 10.2 |
| 56 | DEC + PC | 50:50 | SN | 1 | 90.5 | 2 | 4.7 |

TABLE 8

| Experimental Example | Negative Electrode Active Material Type | D50 (μm) | Specific Surface Area (m²/g) | Content (wt %) | First Negative Electrode Binder Type | First Negative Electrode Binder Content (wt %) | Second Negative Electrode Binder Type | Second Negative Electrode Binder D50 (μm) | Second Negative Electrode Binder Content (wt %) | Thickness (μm) |
|---|---|---|---|---|---|---|---|---|---|---|
| 57 | Graphite | 15 | 4 | 98 | SBR | 2 | — | — | — | 110 |
| 58 | Graphite | 15 | 4 | 98 | SER | 2 | — | — | — | 110 |
| 59 | Graphite | 15 | 4 | 98 | SBR | 2 | — | — | — | 110 |
| 60 | Graphite | 5 | 15 | 98 | SBR | 2 | — | — | — | 110 |
| 61 | Graphite | 5 | 15 | 98 | SBR | 2 | — | — | — | 110 |
| 62 | Graphite | 5 | 15 | 98 | SBR | 2 | — | — | — | 110 |
| 63 | Graphite | 30 | 0.8 | 98 | SBR | 2 | — | — | — | 110 |
| 64 | Graphite | 30 | 0.8 | 98 | SBR | 2 | — | — | — | 110 |
| 65 | Graphite | 30 | 0.8 | 98 | SBR | 2 | — | — | — | 110 |
| 66 | Graphite | 15 | 4 | 98 | SBR | 2 | — | — | — | 30 |
| 67 | Graphite | 15 | 4 | 98 | SBR | 2 | — | — | — | 30 |
| 68 | Graphite | 15 | 4 | 98 | SBR | 2 | — | — | — | 30 |
| 69 | Graphite | 15 | 4 | 98 | SBR | 2 | — | — | — | 250 |

TABLE 9

| Experimental Example | Electrolytic Solution Solvent Type | Mixture Ratio (Ratio by Weight) | Additive Type | Additive Content (wt %) | Ordinary Temperature Charge/Discharge Efficiency (%) | Swelling Rate after Low-Temperature Discharge (%) | High Temperature Swelling Rate (%) |
|---|---|---|---|---|---|---|---|
| 57 | DEC + PC | 50:50 | — | — | 54.4 | 41 | 23.8 |
| 58 | DEC + PC | 99:1 | — | — | 50.7 | 40.7 | 25.9 |
| 59 | DEC + PC | 70:30 | — | — | 57.9 | 43.1 | 22.4 |
| 60 | DEC + PC | 50:50 | — | — | 55.1 | 42.6 | 20.9 |
| 61 | DEC + PC | 99:1 | — | — | 54.4 | 46.4 | 25.2 |
| 62 | DEC + PC | 70:30 | — | — | 54.1 | 40.2 | 26.6 |
| 63 | DEC + PC | 50:50 | — | — | 50.9 | 48.4 | 23.6 |
| 64 | DEC + PC | 99:1 | — | — | 56.8 | 48.6 | 29.4 |
| 65 | DEC + PC | 70:30 | — | — | 52.9 | 46.4 | 24.2 |
| 66 | DEC + PC | 50:50 | — | — | 51 | 41.6 | 27.3 |
| 67 | DEC + PC | 99:1 | — | — | 55.1 | 44.6 | 23.2 |
| 68 | DEC + PC | 70:30 | — | — | 54.3 | 48.5 | 22.5 |
| 69 | DEC + PC | 50:50 | — | — | 52.9 | 47.5 | 27.5 |

TABLE 10

| Experimental Example | Negative Electrode Active Material | | | | First Negative Electrode Binder | | Second Negative Electrode Binder | | | Thickness (μm) |
|---|---|---|---|---|---|---|---|---|---|---|
| | Type | D50 (μm) | Specific Surface Area (m²/g) | Content (wt %) | Type | Content (wt %) | Type | D50 (μm) | Content (wt %) | |
| 70 | Graphite | 15 | 4 | 98 | SBR | 2 | — | — | — | 250 |
| 71 | Graphite | 15 | 4 | 98 | SBR | 2 | — | — | — | 250 |
| 72 | Graphite | 15 | 4 | 98 | SBR | 2 | — | — | — | 110 |
| 73 | Graphite | 15 | 4 | 98 | SBR | 2 | — | — | — | 110 |
| 74 | Graphite | 15 | 4 | 98 | SBR | 2 | — | — | — | 110 |
| 75 | Graphite | 15 | 4 | 98 | SBR | 2 | — | — | — | 110 |
| 76 | Graphite | 15 | 4 | 98 | SBR | 2 | — | — | — | 110 |

TABLE 11

| Experimental Example | Electrolytic Solution | | | | Ordinary Temperature Charge/ Discharge Efficiency (%) | Swelling Rate after Low-Temperature Discharge (%) | High Temperature Swelling Rate (%) |
|---|---|---|---|---|---|---|---|
| | Solvent | | Additive | | | | |
| | Type | Mixture Ratio (Ratio by Weight) | Type | Content (wt %) | | | |
| 70 | DEC + PC | 99:1 | — | — | 58.9 | 41.2 | 22.8 |
| 71 | DEC + PC | 70:30 | — | — | 54.5 | 46.1 | 26.3 |
| 72 | EC + DEC | 50:50 | — | — | 88.2 | 2.7 | 3.5 |
| 73 | EC + EMC | 50:50 | — | — | 90.8 | 2.9 | 3.2 |
| 74 | DEC + PC | 50:50 | SN | 1 | 51.1 | 47.9 | 17.2 |
| 75 | DEC + PC | 50:50 | FEC | 5 | 56.5 | 39.2 | 33.5 |
| 76 | DEC + PC | 50:50 | SN + FEC | 1 + 5 | 56 | 38.6 | 24.9 |

As is clear from Tables 4 and 11, the ordinary-temperature charge/discharge efficiency, the swelling rate after low-temperature discharge, and the high-temperature swelling rate varied greatly depending on the configuration of the negative electrode 34 (negative electrode active material layer 34B).

Specifically, when the negative electrode active material layer 34B includes only the first negative electrode binder (styrene butadiene rubber) (Experimental Examples 57 to 76), no balance has been achieved between the swelling rate after low-temperature discharge and high-temperature swelling rate each suppressed sufficiently and the ordinary-temperature charge/discharge efficiency increased sufficiently.

In contrast, when the negative electrode active material layer 34B includes both of the first negative electrode binder and the second negative electrode binder, when the average particle size (D50) of the negative electrode active material falls within an appropriate range (=5 μm to 30 μm), and when the average particle size (D50) of the second negative electrode binder falls within an appropriate range (=0.1 μm to 10 μm) (Experimental Examples 33 to 56), a balance has been achieved between the swelling rate after low-temperature discharge and high-temperature swelling rate each suppressed sufficiently and the ordinary-temperature charge/discharge efficiency increased sufficiently.

In particular, when the electrolytic solution contains a dinitrile compound, the swelling rate after low-temperature discharge and the high-temperature swelling rate have each been further decreased, and when the electrolytic solution contains a halogenated cyclic carbonate, the ordinary-temperature charge/discharge efficiency has been further increased.

From these results, the use of the plurality of particulate negative electrode active materials (average particle size=5 μm to 30 μm), the first negative electrode binder including a styrene butadiene rubber or the like, and the second negative electrode binder (average particle size=0.1 μm to 10 μm) including polyvinylidene fluoride or the like, also with an average particle size smaller than the average particle size for the plurality of particulate negative electrode active material has improved all of the ordinary-temperature cycle characteristics, the ordinary-temperature charge/discharge characteristics, the ordinary-temperature swelling characteristics, the swelling characteristics after low-temperature discharge, and the high-temperature swelling characteristics. Therefore, excellent battery characteristics have been obtained in the secondary battery.

The present technology has been described above with reference to an embodiment and examples, but the present technology is not limited to the aspects described in the embodiment and the examples, and various modifications are possible.

For example, in order to describe the configuration of the secondary battery according to the present technology, the cases where the battery structures have a cylindrical type and a laminate film type and the battery elements have wound structures have been cited as examples. However, the secondary battery according to the present technology is applicable to cases of having other battery structures such as a coin type, a rectangular type, and a button type, and also applicable when the battery element has other structures such as a laminated structure.

In addition, for example, the negative electrode for a secondary battery according to the present technology is not limited to any secondary battery, but may be applied to other electrochemical devices. The other electrochemical devices may be, for example, a capacitor and the like.

It should be understood that the effects described in this description are merely considered by way of example, and not to be considered limited, and there may be other effects.

The present technology is described below in further detail according to an embodiment.

(1)

A secondary battery including an electrolytic solution together with a positive electrode and a negative electrode, where the negative electrode includes a plurality of particulate negative electrode active materials, a first negative electrode binder, and a plurality of particulate second negative electrode binders with an average particle size smaller than the average particle size for the plurality of particulate negative electrode active materials, the plurality of particulate negative electrode active materials has an average particle size of 5 μm or more and 30 μm or less, the first negative electrode binder includes at least one of styrene butadiene rubber and a derivative thereof, the plurality of particulate second negative electrode binders includes at least one of polyvinylidene fluoride and a derivative thereof, and the plurality of particulate second negative electrode binders has an average particle size of 0.1 μm or more and 10 μm or less.

(2)

The secondary battery according to (1) as mentioned above, where the plurality of particulate second negative electrode binders is at least partially present in a gap between the plurality of particulate negative electrode active materials.

(3)

The secondary battery according to (1) or (2) as mentioned above, where the content 100−X−Y (wt %) of the plurality of particulate negative electrode active materials, the content X (wt %) of the first negative electrode binder, and the content Y (wt %) of the plurality of particulate second negative electrode binders preferably satisfy the conditions of: X=0.5 wt % or more and 5 wt % or less and Y=0.5 wt % or more and 5 wt % or less.

(4)

The secondary battery according to any one of (1) to (3) as mentioned above, where the negative electrode includes a negative electrode active material layer including the plurality of particulate negative electrode active materials, the first negative electrode binder, and the plurality of particulate second negative electrode binders, and the negative electrode active material layer has a thickness of 30 μm or more and 250 μm or less.

(5)

The secondary battery according to any one of (1) to (4) as mentioned above, where the plurality of particulate negative electrode active materials includes a carbon material.

(6)

The secondary battery according to any one of (1) to (4) as mentioned above, where the plurality of particulate negative electrode active materials includes a material containing silicon as a constituent element.

(7)

The secondary battery according to any one of (1) to (6) as mentioned above, where the secondary battery further includes a film-shaped exterior member, and the positive electrode, the negative electrode, and the electrolytic solution are housed inside the film-shaped exterior member.

(8)

The secondary battery according to any one of (1) to (7) as mentioned above, where the secondary battery is a lithium ion secondary battery.

(9)

A negative electrode for a secondary battery, including a plurality of particulate negative electrode active materials, a first negative electrode binder, and a plurality of particulate second negative electrode binders with an average particle size smaller than the average particle size for the plurality of particulate negative electrode active materials, where the plurality of particulate negative electrode active materials has an average particle size of 5 μm or more and 30 μm or less, the first negative electrode binder includes at least one of styrene butadiene rubber and a derivative thereof, the plurality of particulate second negative electrode binders includes at least one of polyvinylidene fluoride and a derivative thereof, and the plurality of particulate second negative electrode binders has an average particle size of 0.1 μm or more and 10 μm or less.

(10)

A battery pack including:

the secondary battery according to any one of (1) to (8) as mentioned above;

a control unit for controlling the operation of the secondary battery; and a switch unit for switching the operation of the secondary battery in accordance with an instruction from the control unit.

(11)

An electric vehicle including:

the secondary battery according to any one of (1) to (8) as mentioned above;

a converter for converting electric power supplied from the secondary battery, to a driving force;

a driving unit for driving in response to the driving force; and a control unit for controlling the operation of the secondary battery.

(12)

A power storage system including:

the secondary battery according to any one of (1) to (8) as mentioned above;

one or more electric devices that are supplied with electric power from the secondary battery; and a control unit that controls the power supply to the electric devices from the secondary battery.

(13)

A power tool including:

the secondary battery according to any one of (1) to (8) as mentioned above; and a movable part that is supplied with electric power from the secondary battery.

(14)

An electronic device including, as a power supply source, the secondary battery according to any one of (1) to (8) as mentioned above.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a positive electrode,
a negative electrode, and
an electrolytic solution,
wherein the negative electrode includes a plurality of particulate negative electrode active materials,
wherein the plurality of particulate negative electrode active materials have a median diameter D50 of 5 μm or more and 30 μm or less,
wherein the negative electrode comprises a plurality of particulate binders,
wherein the particulate binders consist essentially of a two binder system consisting essentially of a first negative electrode binder and a plurality of second negative electrode binders,
wherein the first negative electrode binder includes one or both of styrene butadiene rubber and a derivative of styrene butadiene,
wherein the plurality of second negative electrode binders include one or both of polyvinylidene fluoride and a derivative of polyvinylidene fluoride,
wherein the plurality of second negative electrode binders have a median diameter D50 of 1.0 μm or more and 10 μm or less,
wherein the median diameter D50 of the plurality of second negative electrode binders is smaller than the median diameter D50 of the plurality of particulate negative electrode active materials,
wherein the electrolytic solution includes a nonaqueous solvent including one or both of a cyclic carbonate and a chain carbonate,
wherein the cyclic carbonate includes one or more of ethylene carbonate, propylene carbonate, and butylene carbonate,
wherein a content of the cyclic carbonate in the electrolytic solution is 50 wt. % or less,
wherein the chain carbonate includes one or more of dimethyl carbonate, diethyl carbonate, ethyl methyl carbonate, and methyl propyl carbonate,
wherein at least some of the plurality of second negative electrode binders are provided in a gap between the plurality of particulate negative electrode active materials, and
wherein the first negative electrode binder coats respective surfaces of the plurality of particulate negative electrode active materials.

2. The secondary battery according to claim 1, wherein a first content 100−X−Y (wt %) of the plurality of particulate negative electrode active materials, a second content X (wt %) of the first negative electrode binder, and a third content Y (wt %) of the plurality of second negative electrode binders satisfy conditions of: X=0.5 wt % or more and 5 wt % or less and Y=0.5 wt % or more and 5 wt % or less.

3. The secondary battery according to claim 1, wherein the negative electrode includes a negative electrode active material layer including the plurality of particulate negative electrode active materials, the first negative electrode binder, and the plurality of second negative electrode binders, and
the negative electrode active material layer has a thickness of 30 μm or more and 250 or less.

4. The secondary battery according to claim 1, wherein the plurality of particulate negative electrode active materials includes a carbon material.

5. The secondary battery according to claim 1, wherein the plurality of particulate negative electrode active materials includes a material including silicon.

6. The secondary battery according to claim 1, wherein the secondary battery further includes a film-shaped exterior member, and
the positive electrode, the negative electrode, and the electrolytic solution are provided inside the film-shaped exterior member.

7. The secondary battery according to claim 1, wherein the secondary battery includes a lithium ion secondary battery.

8. A battery pack comprising:
the secondary battery according to claim 1;
a controller configured to control an operation of the secondary battery; and
a switch configured to switch an operation of the secondary battery in accordance with an instruction from the controller.

9. An electric vehicle comprising:
the secondary battery according to claim 1;
a converter configured to convert electric power supplied from the secondary battery, to a driving force;
a driver configured to drive in response to the driving force; and
a controller configured to control an operation of the secondary battery.

10. A power storage system comprising:
the secondary battery according to claim 1;
one or more electric devices configured to be supplied with electric power from the secondary battery; and
a controller configured to control a power supply to the electric devices from the secondary battery.

11. A power tool comprising:
the secondary battery according to claim 1; and
a movable part configured to be supplied with electric power from the secondary battery.

12. An electronic device comprising the secondary battery according to claim 1 as a power supply source.

13. The secondary battery according to claim 1, wherein the first negative electrode binder is styrene butadiene rubber, and wherein the plurality of second negative electrode binders are polyvinylidene fluoride.

* * * * *